United States Patent Office 3,490,004
Patented Jan. 13, 1970

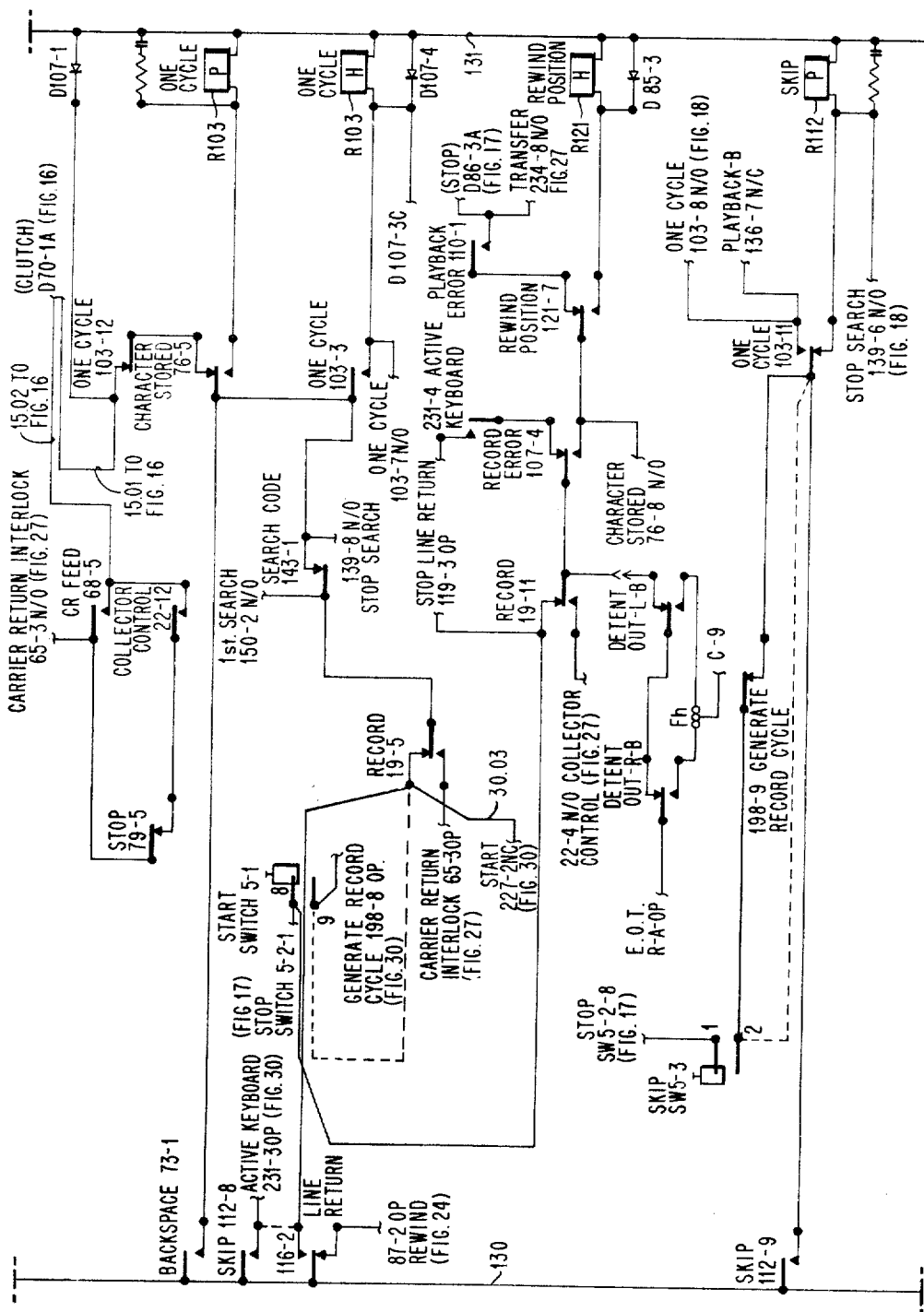

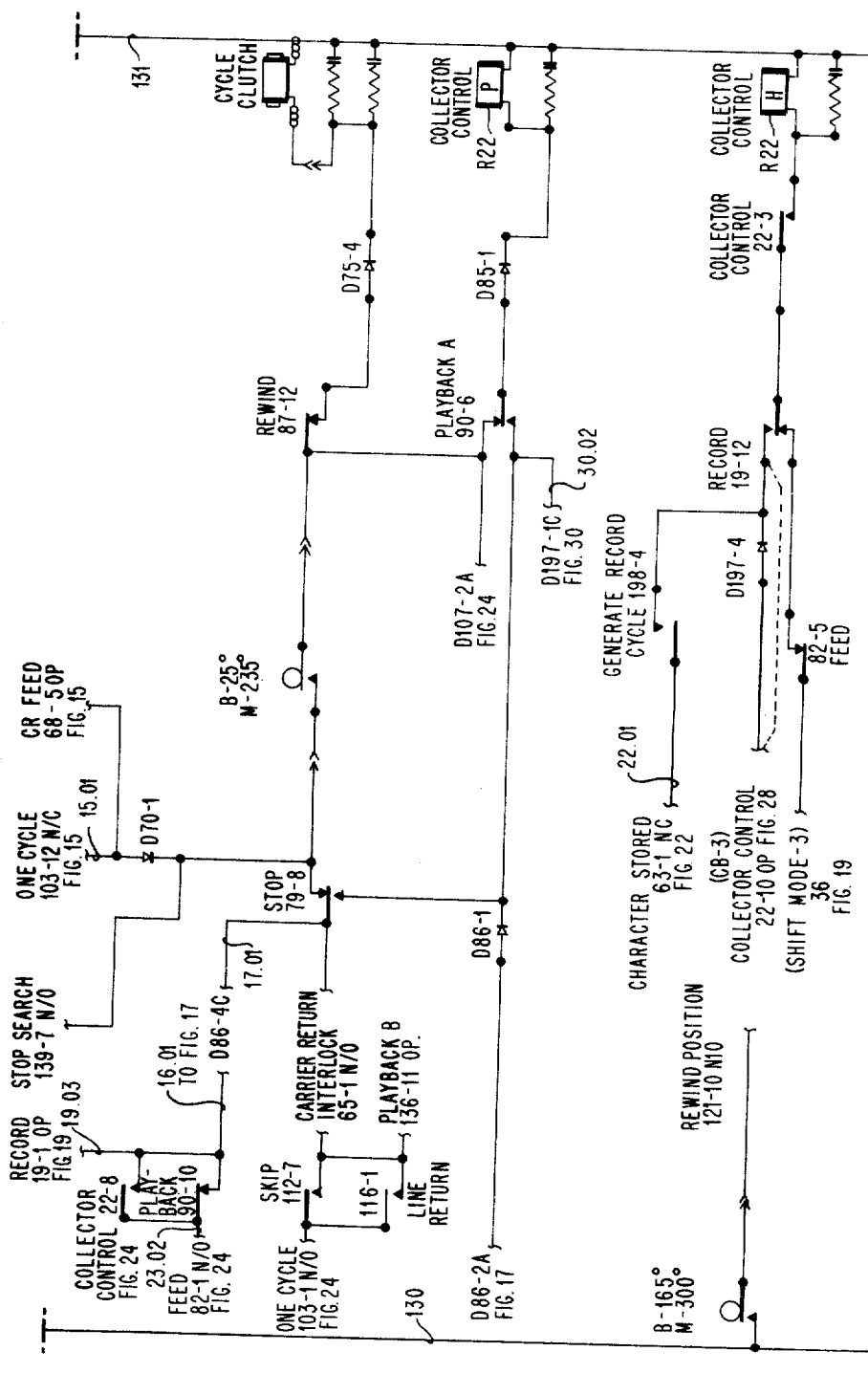

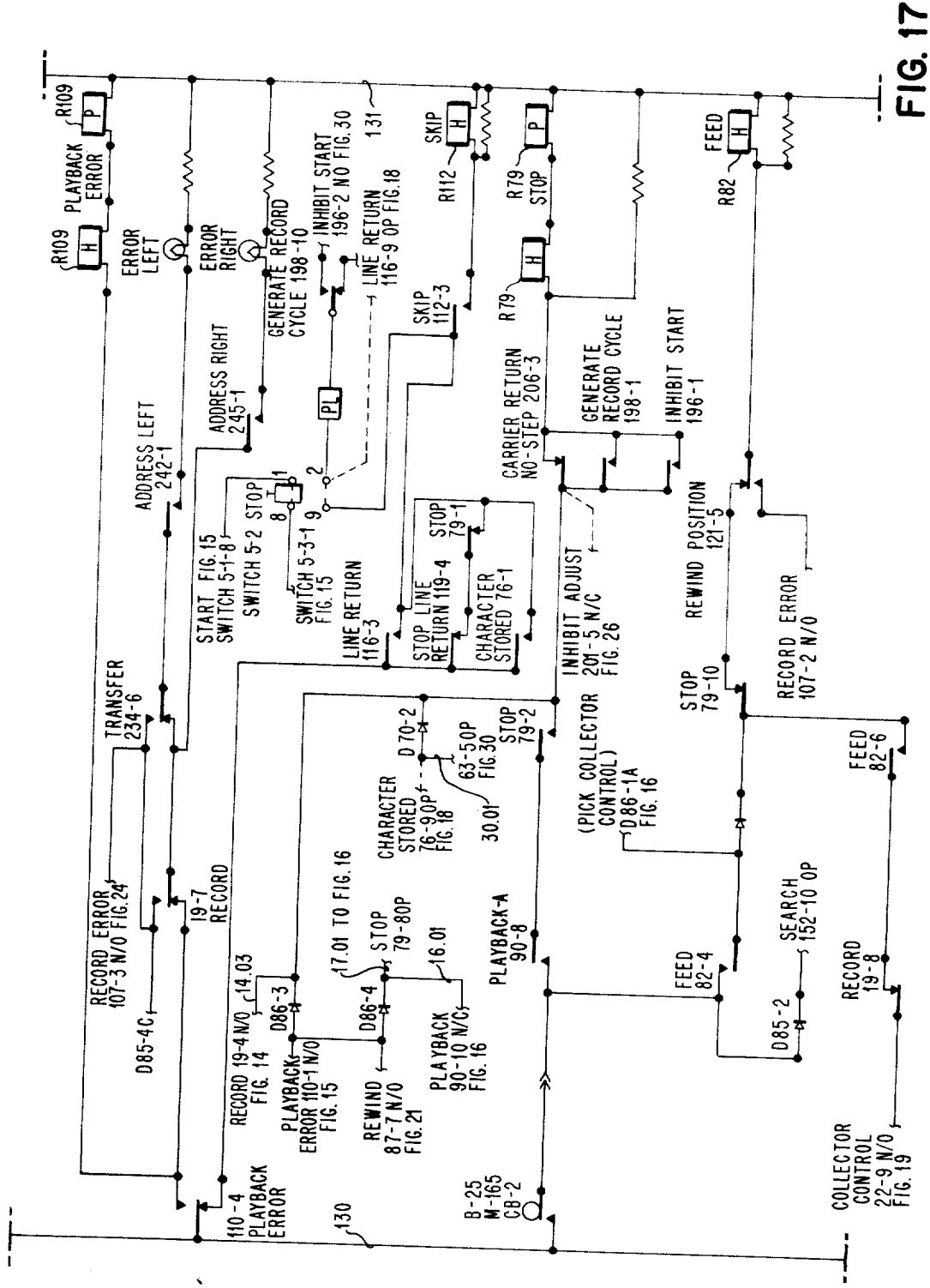

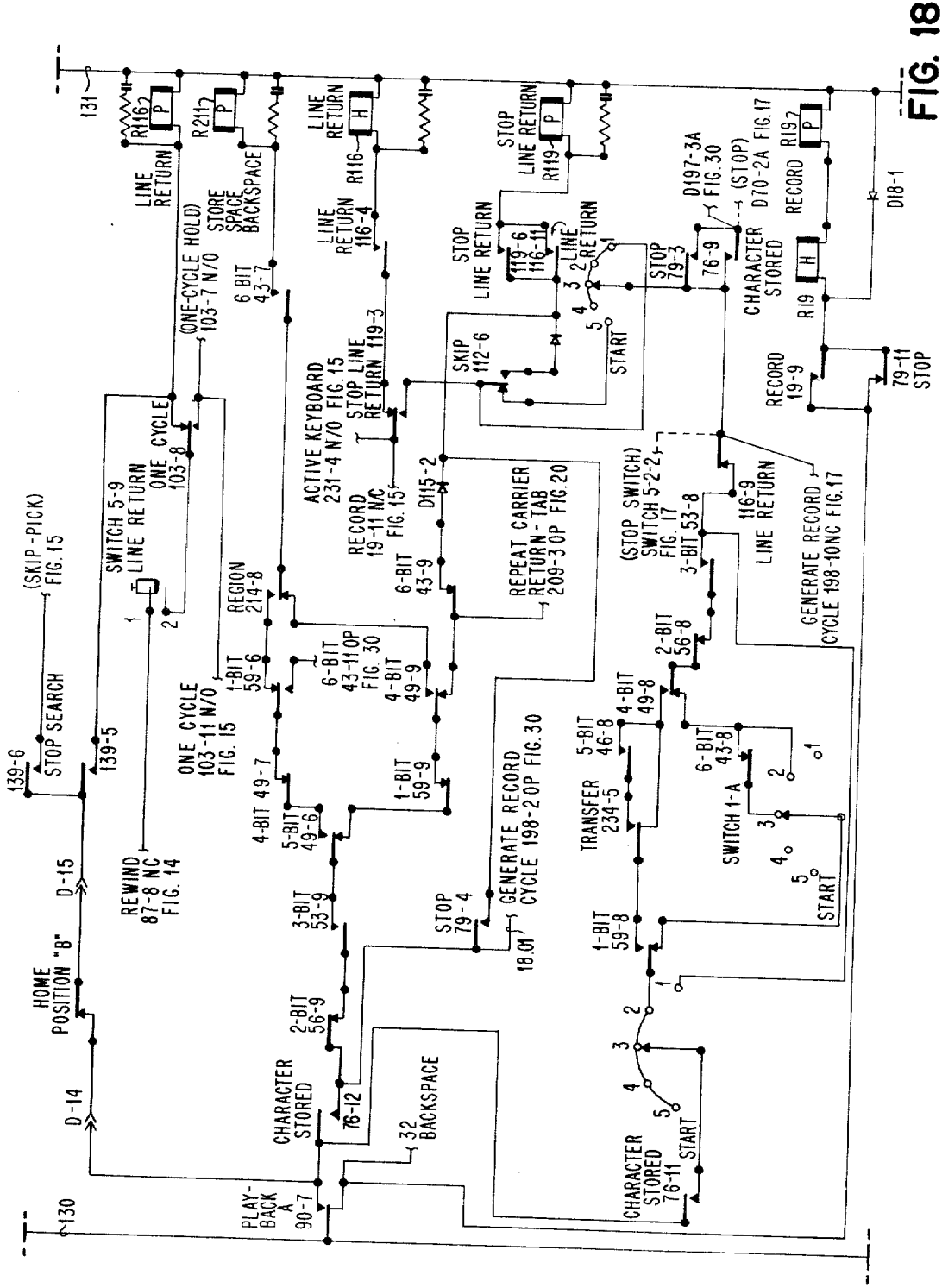

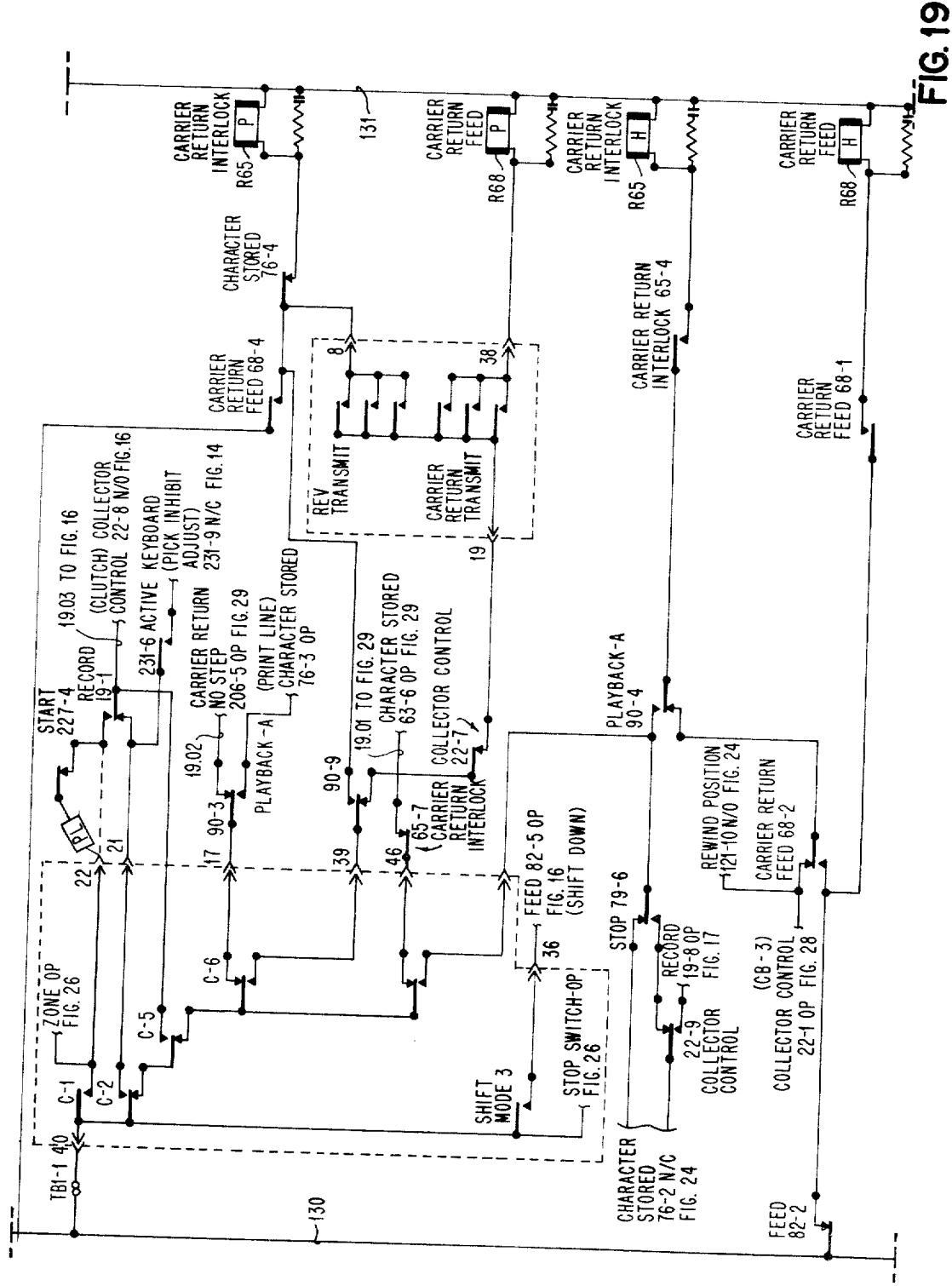

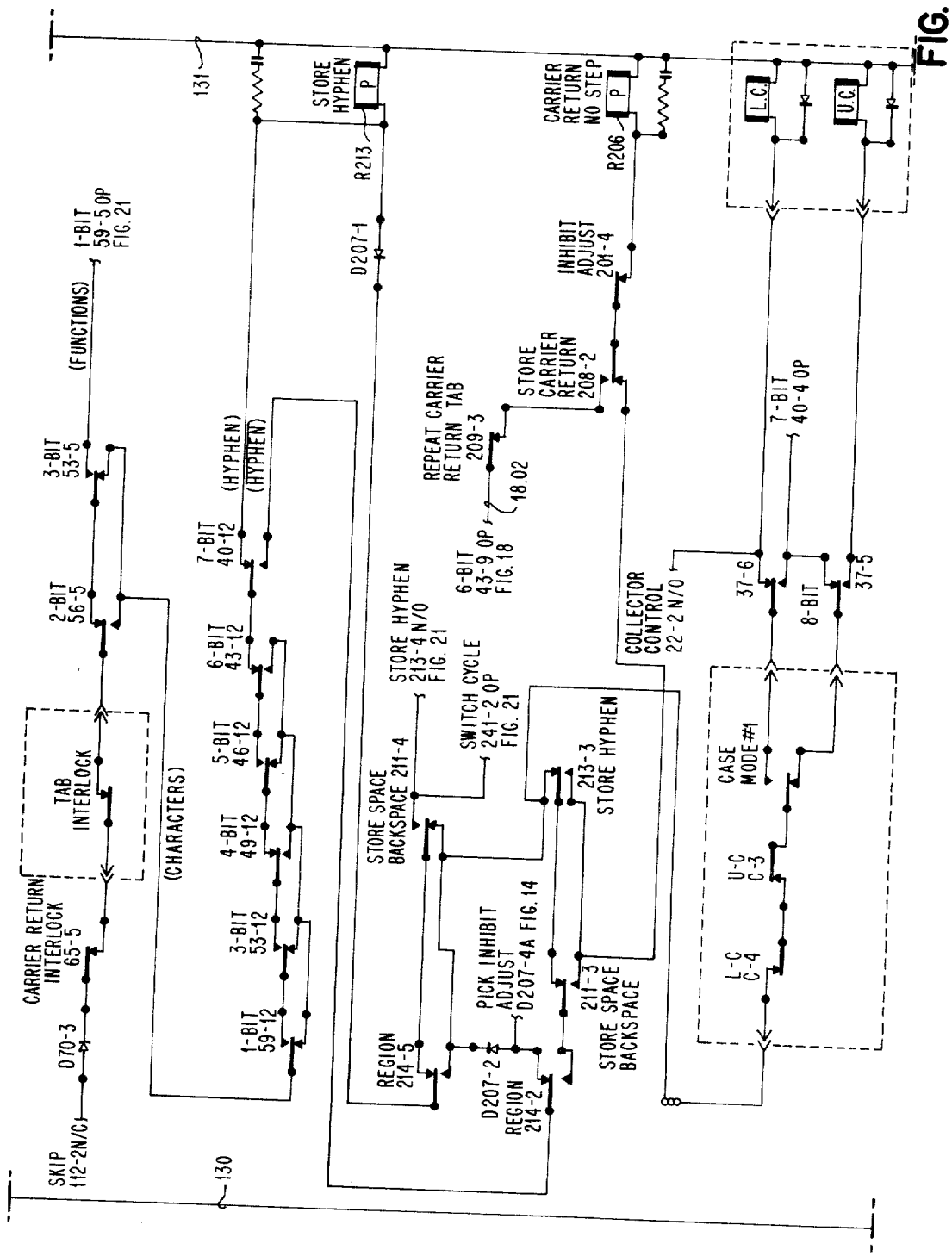

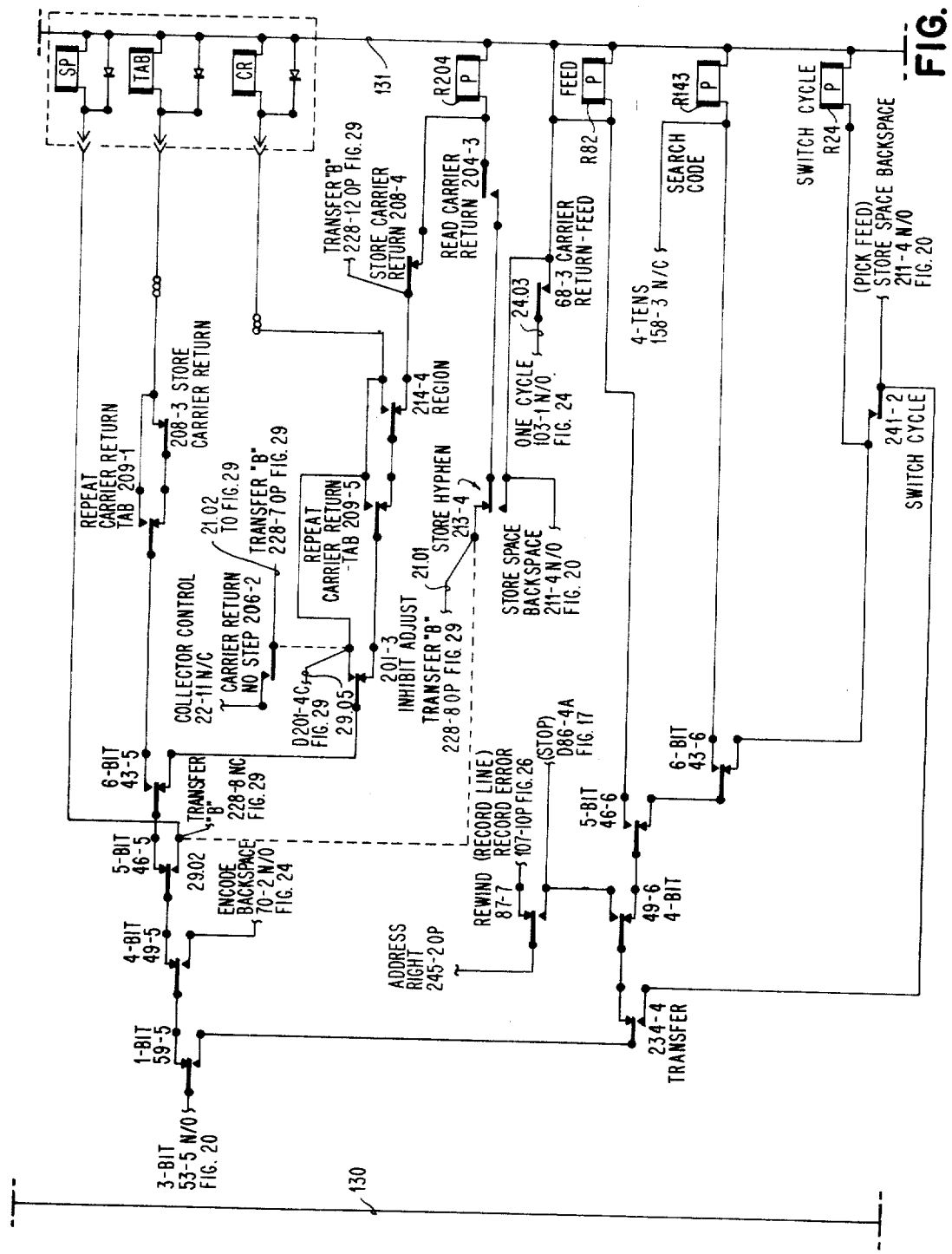

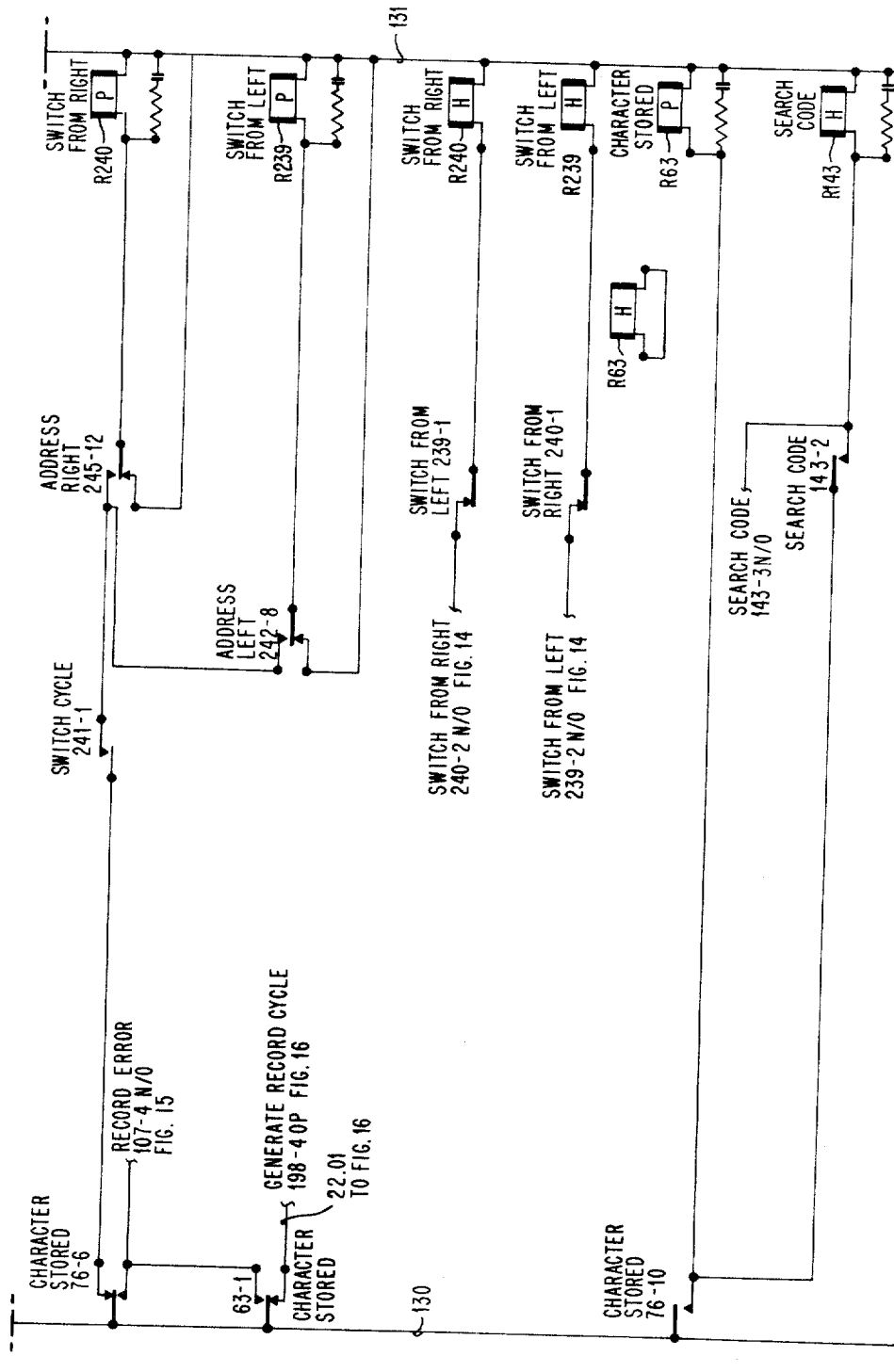

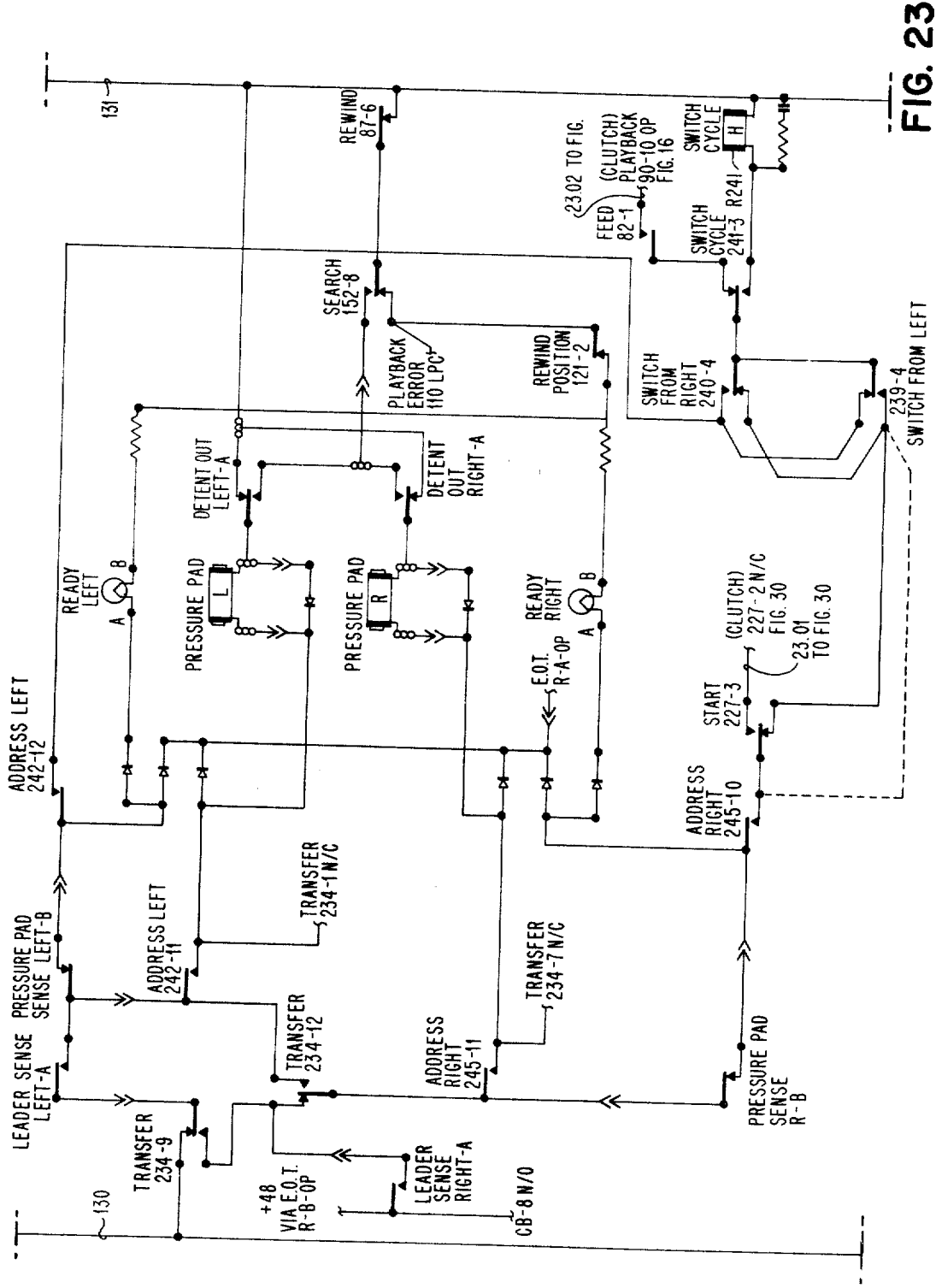

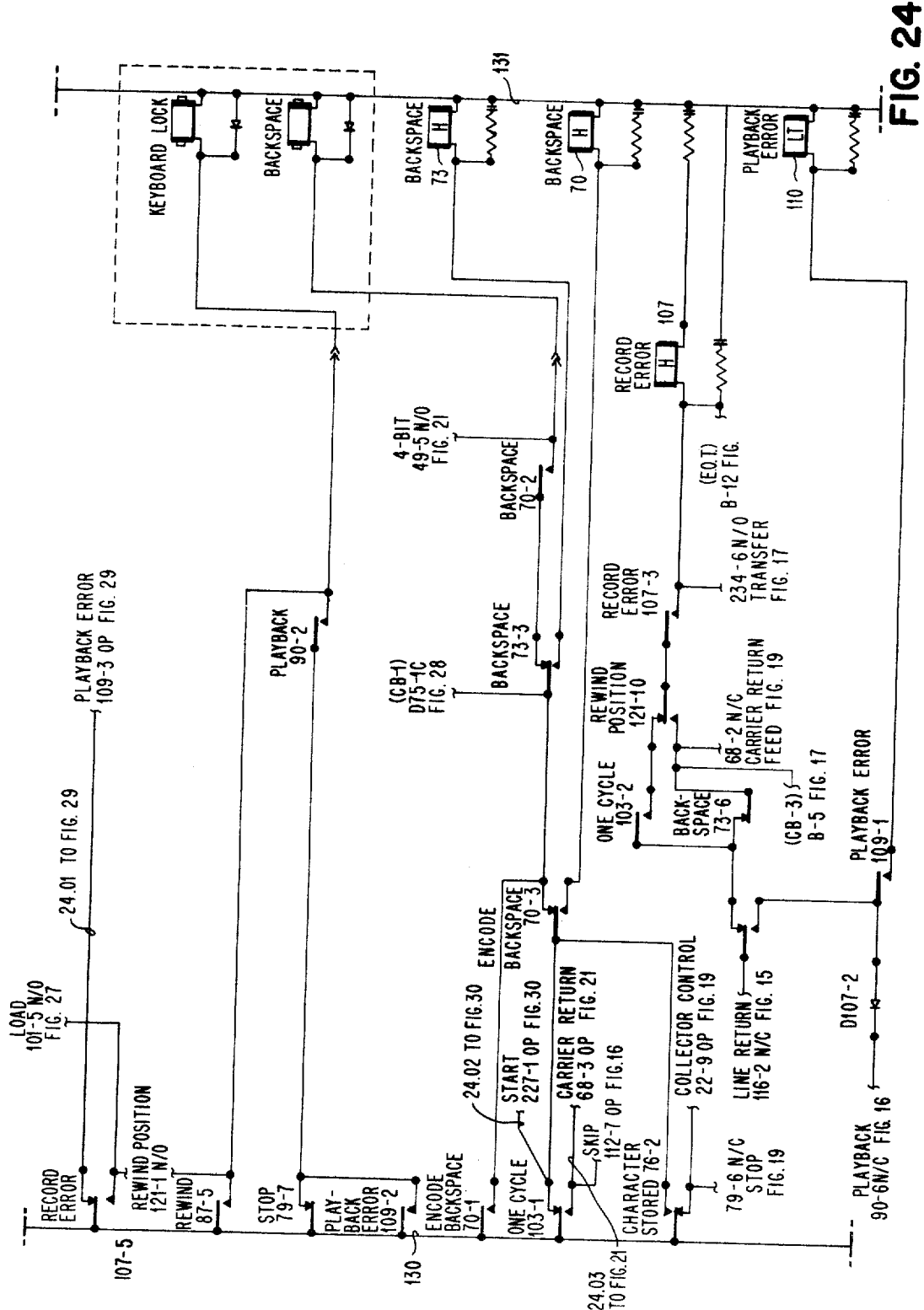

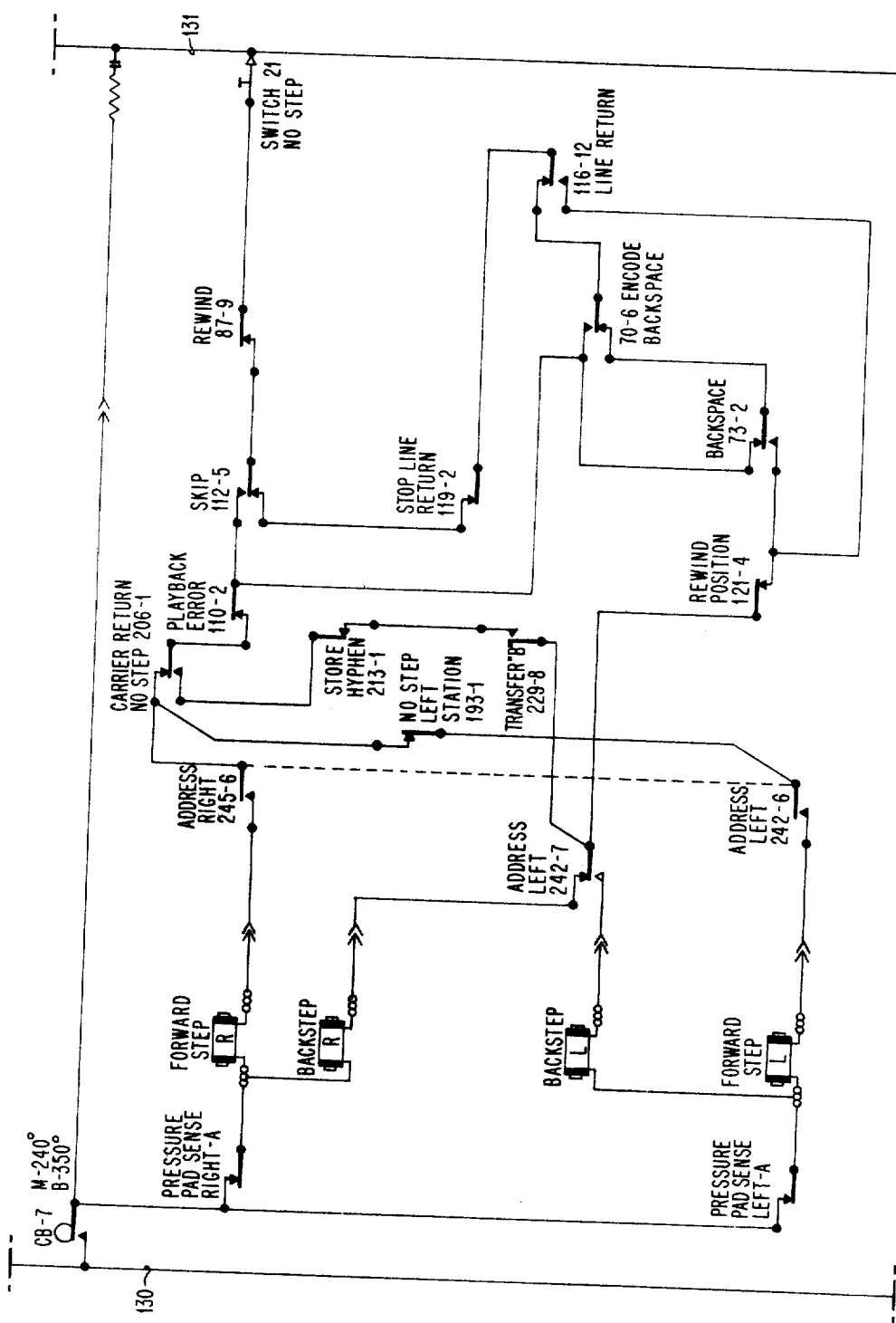

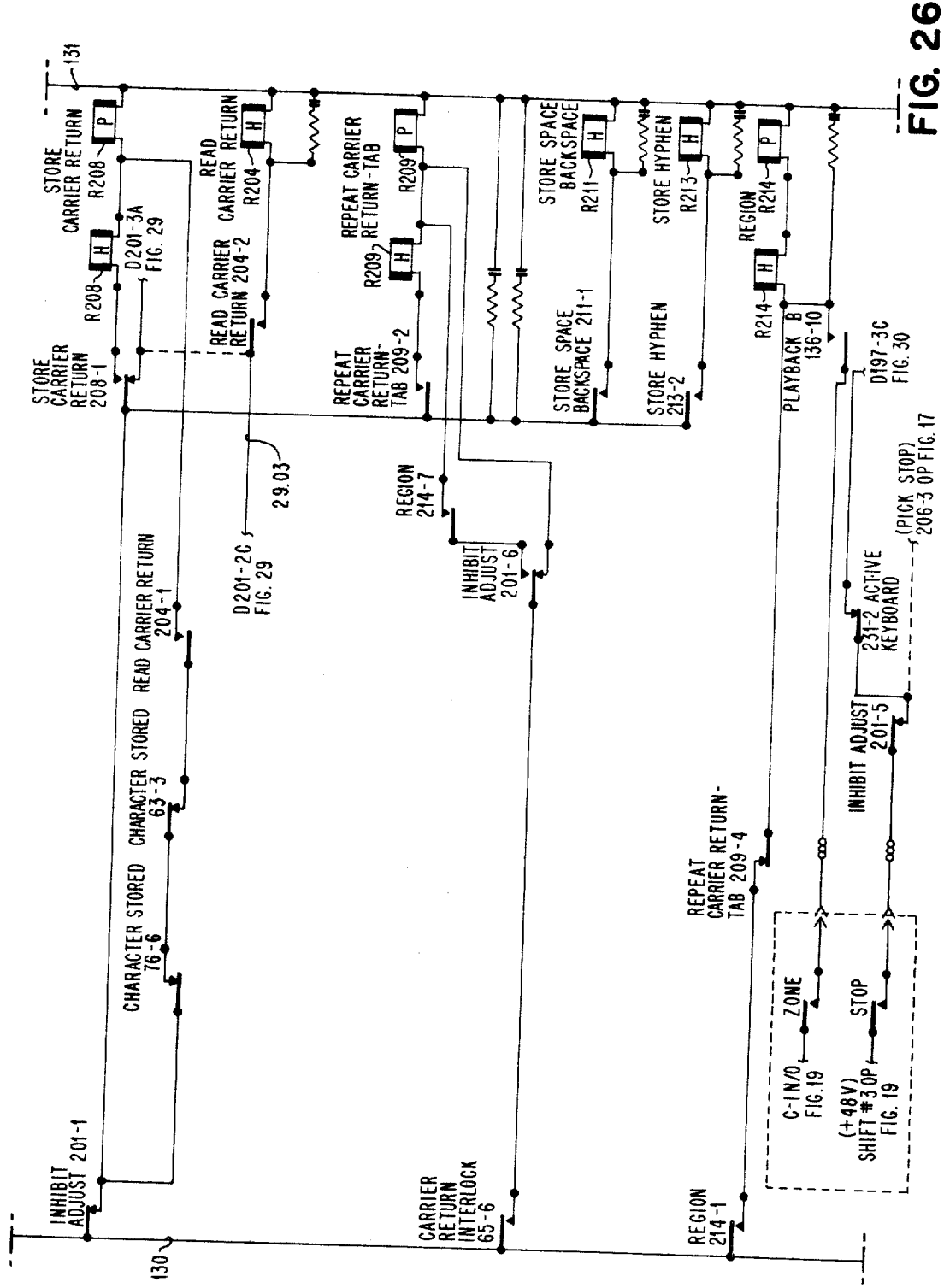

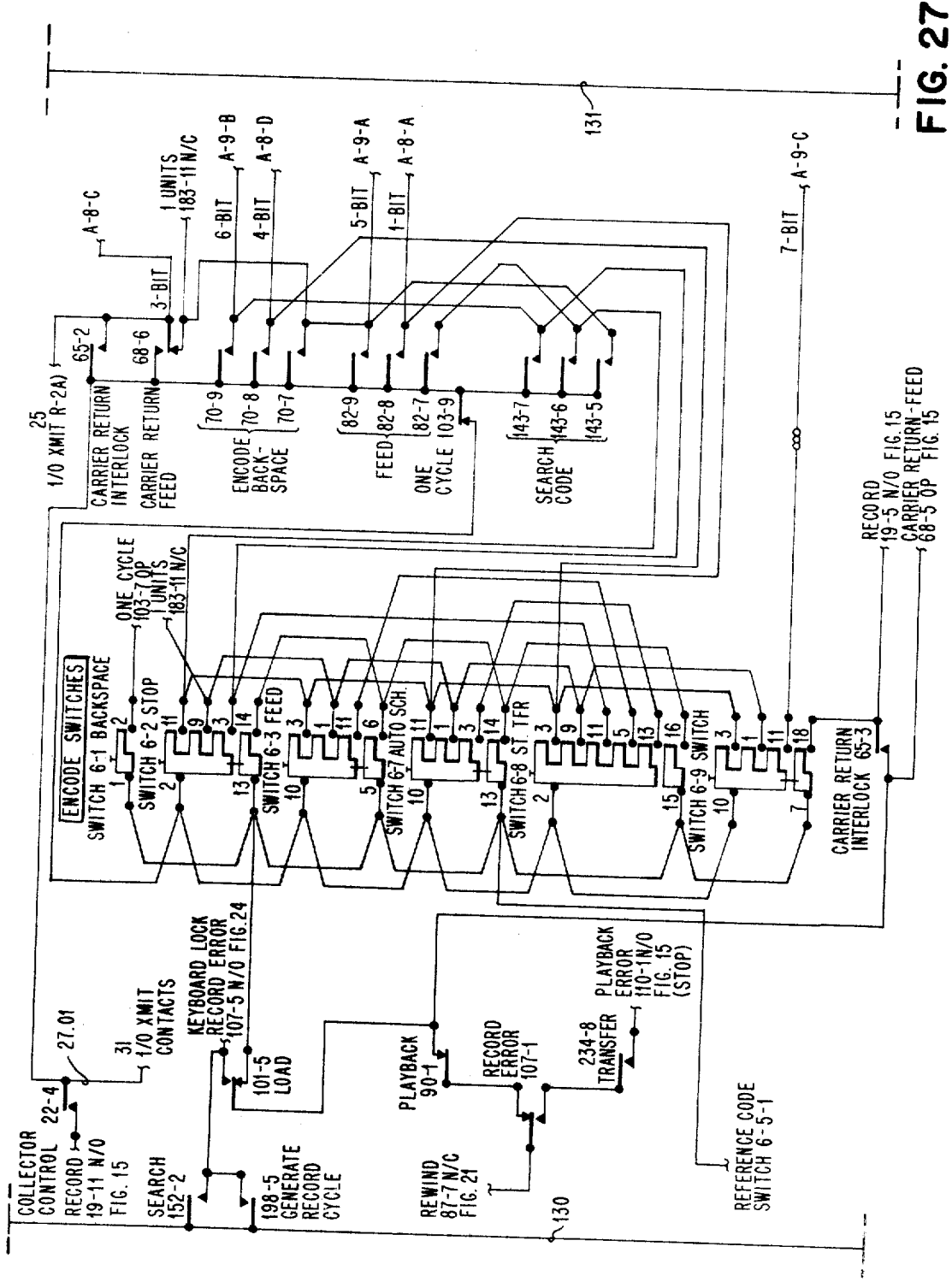

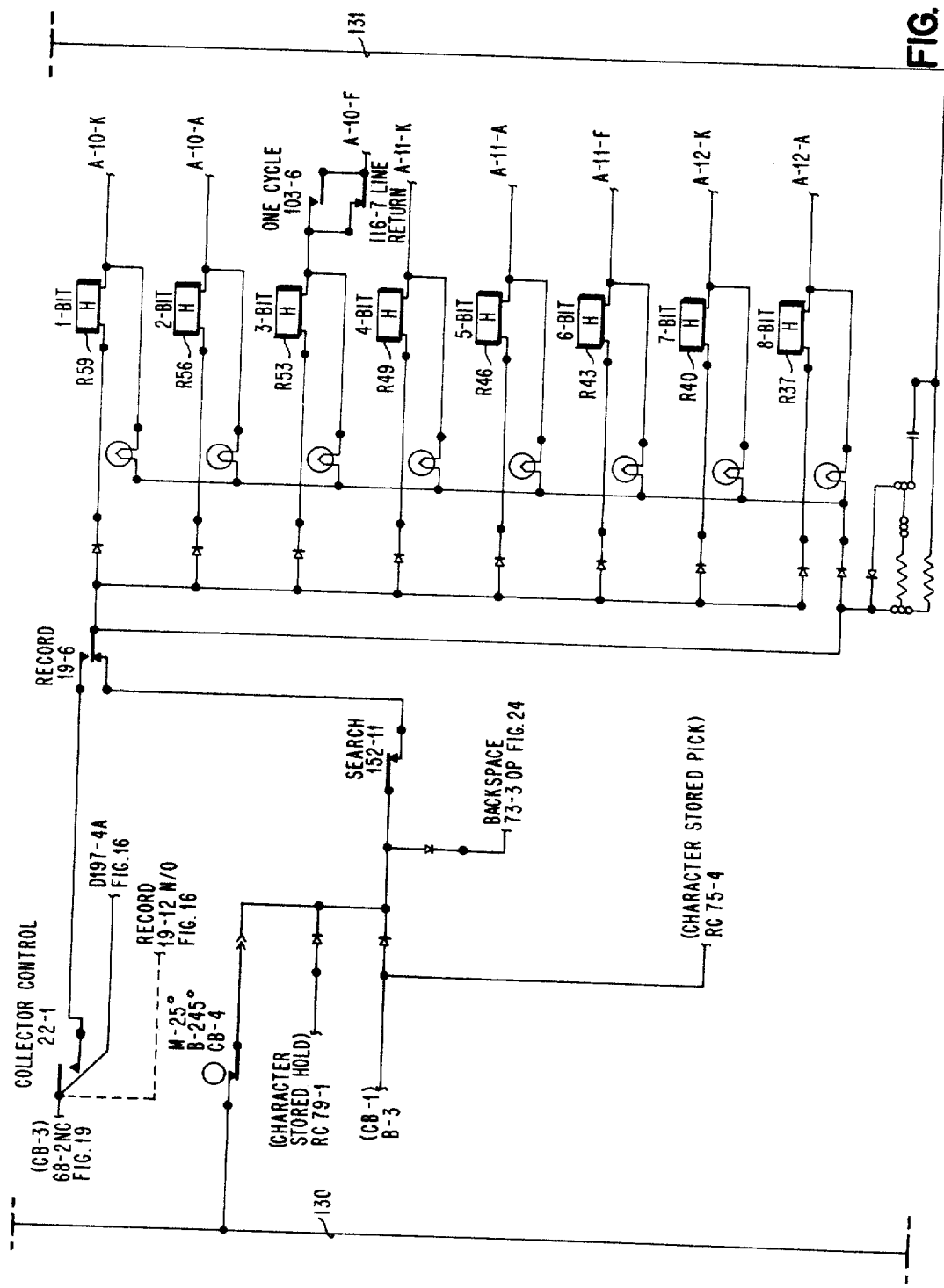

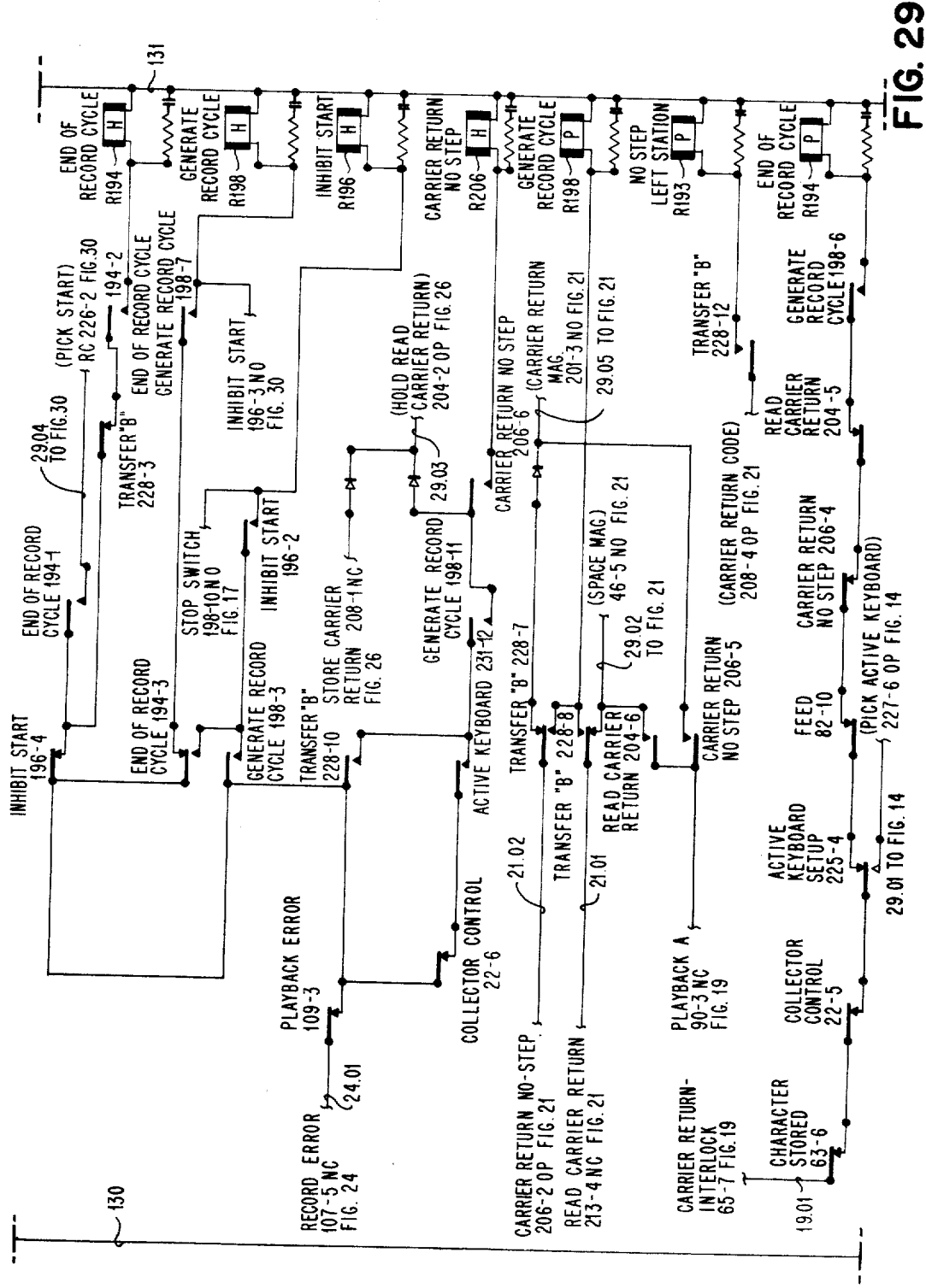

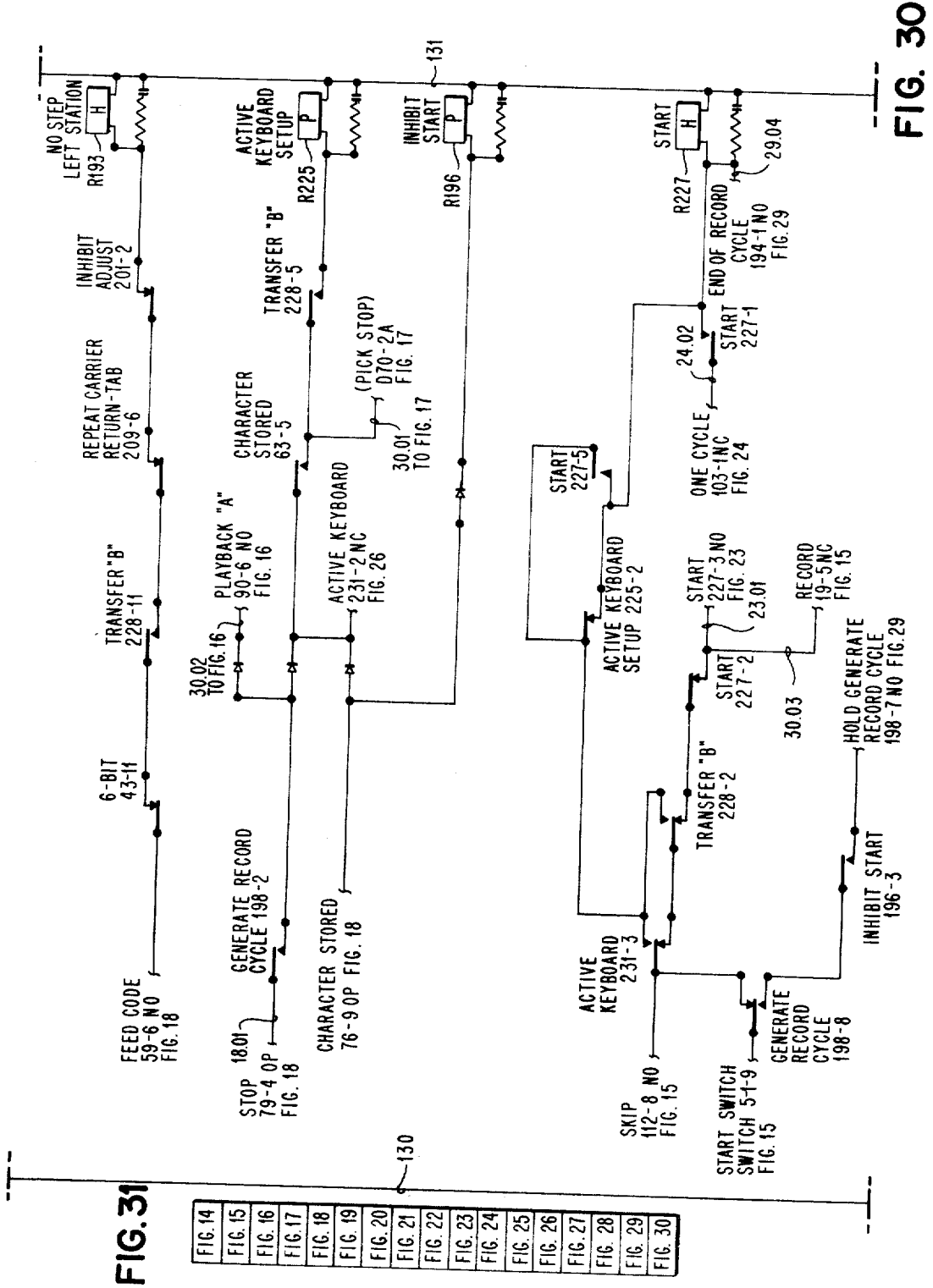

3,490,004
DATA PROCESSING AND PRINTING APPARATUS
Roger F. Ross, Lexington, Ky., assignor to International Business Machines Corporation, Armonk, N.Y., a corporation of New York
Filed June 3, 1966, Ser. No. 555,091
Int. Cl. G11b 13/00; G06f 1/00
U.S. Cl. 340—172.5        30 Claims

ABSTRACT OF THE DISCLOSURE

The invention relates to code conversion arrangements for apparatus having two magnetic tape reading and recording stations and an associated printer. It is operable in a Transfer Adjust mode to transfer data and functional characters from one tape to another tape directly while effecting printing of the data in accordance with a desired line ending format (length), and is further operable, when the characters transferred from one tape to the other do not agree with the actual characters printed or functional operations of the printer, to automatically change the mode of the apparatus so that characters not in agreement on the newly prepared tape are revised directly under control of the printer.

---

The invention has particular utility in connection with automatic printing apparatus having facilities for recording and reproducing information stored in coded form in a magnetic tape record media, such as the apparatus disclosed in U.S. Patent 3,260,340 with Henry C. Locklar and Donald E. Sims, inventors, filed June 25, 1964, entitled "Revision System for Data Recording and Printing Apparatus," and U.S. Patent 3,297,124, with Donald E. Sims as inventor, filed Apr. 6, 1966, and entitled "Data Recording and Printing Apparatus Capable of Responding to Changed Format."

The apparatus disclosed in both the aforementioned patent applications incorporates a single head printer that is interconnected for entry and printing purposes with a magnetic tape recording and reproducing unit. The printer is generally of the type disclosed in U.S. Patent 2,919,002, L. E. Palmer, inventor, entitled "Selection Mechanism for a Single Printing Element Typewriter" as modified for Input/Output operation in U.S. Patent 3,092,854, F. E. Becker, et al., entitled "Typewriter Input Checking Mechanism." The printer has the usual functional and informational character keys with a single printing element mounted on a carrier for escapement and printing movement adjacent to a platen that remains stationary, except during line spacing operations. The magnetic tape recording and reproducing unit has a number of control knobs and buttons for establishing Record, Playback, Transfer, and Adjust modes of operation, for entering particular character codes to which the magnetic tape unit is responsive, for selecting and initiating a Search operation for particular blocks of information stored on the magnetic record media, and various indicator lamps to indicate the status of the equipment.

A line revision feature is described in U.S. Patent 3,260,340, with provision for automatically establishing extra storage space during the recording of information on a revisable record media for subsequent use during correction or expansion of the recorded information. To allow for expansion of information during revision procedures, redundant codes to which the printer is normally non-responsive, such as Feed codes, are automatically recorded on the magnetic tape at the end of each line of information concurrently with the recording of a Carrier Return code. The apparatus has means effective during the playback of information for selecting various types of data units, such as blocks, lines, words, and characters for reading and printing, thereby maintaining a measure of control by the operator for the addition, deletion or correction of the information previously recorded.

The Sim's Patent 3,297,124 describes apparatus of a comparable nature having provision for preparing documents automatically according to desired format arrangements that may be the same or different than the format arrangements established during the preparation of an original document. During the preparation of an original document and the recording of the related data on a magnetic tape, the lengths of lines are generally established by the left and right margin limits on the printer. During a subsequent playback of the recorded information, it may be desired to shorten or lengthen the lines of information. Accordingly, the left and right margin limits are repositioned to the desired line length. During playback, the data is printed according to the new format with the apparatus responding to recorded code combinations in different ways depending upon whether they are encountered in a line ending area referred to as the "Region," or in an area outside the Region.

The automatic adjustment of lines of information is performed during a mode of operation referred to as the "Adjust" mode. The Adjust mode involves the playing back of one of the magnetic tapes at a right-hand station or left-hand station in the apparatus. During another mode of operation, referred to as "Transfer Adjust," the equipment reads a magnetic tape at the right-hand station, operates the printer under control of the data and the functional codes encountered in the tape and concurrently records the information on another magnetic tape at the left-hand station. In order to establish a high-speed operation, the data recorded passes through electronic logic directly from the right-hand tape station to the left-hand tape station, and in general, duplicates the data originally recorded on the right-hand tape. That is, the codes read at the right-hand station are recorded on the left-hand tape with no modification or conversion. However, new entries may be made from the printer keyboard onto the left-hand tape.

During the Adjust or Transfer Adjust modes, the response of the printer varies depending upon whether the print head is or is not, in the line ending Region. As an example, a Carrier Return code encountered in the Region effects a Carrier Return operation of the printer, while the same Carrier Return code encountered outside the Region effects a space operation of the printer. As another example, a Space code in the Region effects a Carrier Return operation of the printer, while a Space code outside the Region results in a normal space operation. In a Transfer Adjust mode of operation, while the printer responds differently to the code combinations encountered in order to adjust the printed lines of information, no such variable response is provided for the recording of characters in the left-hand tape in response to characters read in the right-hand tape.

Frequently, while in a Transfer Adjust mode, reading of the right-hand tape stops, either under manual control or under control of a Stop code sensed in the right-hand tape, to permit the typing of additional information or revised information on the printed document. The apparatus is manually placed in a Record Left mode during which characters are recorded on the left-hand tape at the same time as they are printed on the document. Functional characters are also recorded in response to functional operations, such as Carrier Return, Tab, etc. When this occurs, the information recorded on the left-hand tape is a true representation of the action of the printer, in contrast with the Transfer operation from the right-hand tape when the action of the printer may or may not follow the code representations stored in the right-hand tape. Due to the fact that the printer response to data and functional characters is likely to differ considerably from the original data and functional character arrangement on the original tape at the right-hand station, and also due to the fact that the left-hand tape contains information both from the right-hand tape and from manual keyboard entry, it is necessary to use the left-hand tape only in an Adjust mode of operation and not as an original tape for normal playback. This is true, primarily due to the fact that the line ending areas for the data recorded on the left-hand tape vary considerably.

Whenever the data recorded on the left-hand tape is derived in this intermixed fashion from the right-hand tape and from the printer, the left-hand tape does not always reflect the actual document printing. Therefore, the left-hand tape cannot be conveniently used as an original tape in any mode, except the Adjust mode, for preparing additional documents, as desired. It is desirable, however, to maintain the arrangement for directly transferring data from the right-hand tape, since a higher speed of operation is achieved. In many cases, it is also desirable that the information, both data and functional, recorded on the left-hand tape, be an accurate representation of the data and functional response of the printer during operation. This is advantageous if subsequent revision of the revision just completed is necessary. In accordance with the present invention, the foregoing is accomplished by maintaining the normal data transfer operations and by automatically modifying the mode of operation as and when required to effect conversion of coded information so that the information recorded on the left-hand tape accurately reflects the printing and functional actions of the printer.

Therefore, an object of the invention is to provide for automatic mode control of a data processing and printing apparatus.

Another object of the invention is to provide a data processing and printing apparatus with automatic mode control facilities operable during line adjustment operations.

A further object of the invention is to provide facilities for preparing printed documents from a first record media and for concurrently preparing a second record media having information representative of data and functional operations.

Another object of the invention is to facilitate the first and subsequent revisions of a document.

A a still further object of the invention is to enable the preparation of a record media containing information derived from another record media, as one source, and from a printer, as another source.

Also, another object of the invention is to provide for the preparation of a record media concurrently with operation of a printer under control of another record media, the prepared record media comprising information directly received from the other record media, as well as information originating from said other media, but indirectly supplied from the printer.

Still another object of the invention is to provide apparatus operable at relatively high speeds for preparing a document having format requirements that differ from those of an original document, while concurrently preparing a related record media.

A further object of the invention is to provide for forward and reverse stepping control of a record media that is dependent upon coded character recognition and document format indications.

A still further object of the invention is to enable the preparation of a revisable record media having expansion space determined by the format arrangement of an original document and for subsequent preparation of another revisable record media having expansion space determined by the format arrangement of a subsequently prepared document.

Another object of the invention is to prepare a printed document by signals derived from a first record media and with appropriate line adjustment control, while concurrently preparing another record media for subsequent document preparation and line adjustment control.

A still further object of the present invention is to prepare a document from a record media with lines of information on the document being expanded or contracted in relation to the comparable lines of information stored in the record media while concurrently preparing another record media that accurately reflects the readjusted line situation on the document just prepared.

Another object of the invention is to simplify the preparation of a record media from an original record media and printer while insuring that the prepared record media is susceptible to the same recording and playback control arrangements as the original media.

Another object of the invention is to establish automatic revision of coded information recorded at high speeds under control of criteria related to document format arrangements.

And another object of the present invention is to operate a printer under control of a first record media while concurrently preparing another record media having printer codes and non-printer codes that are recorded under control of document format indications.

An additional object of the invention is to provide for automatic recording cycles to effect revision of data in a selective manner during a transfer operation from one record media to another.

Another object of the invention is to effect a rerecording of data transferred from one record media to another when a determination is made that the data is not compatible with predetermined transfer criteria.

In accordance with a preferred embodiment of the invention, the apparatus has two magnetic tape reading and recording stations and an associated printer, is operable in one mode of operation to transfer data and functional characters from one tape station to another tape station directly while effecting printing of the data in accordance with a desired line ending format, and is further operable, when the characters transferred from one tape to the other do not agree with the actual characters printed or functional operations of the printer, to automatically change the mode of the apparatus so that characters not in agreement are revised directly under control of the printer on the newly prepared tape.

The apparatus is operable to effect forward stepping, no stepping, and back stepping of the tapes, as required, to insure appropriate reading and revision of characters.

Redundant Feed codes provided for expansion and accompanying Carrier Return codes on the original tape are deleted whenever, during the line adjustment procedures, the printer does not perform a Carrier Return operation, while Space codes read in the original tape are converted in the line ending Region to Carrier Return codes accompanied by Feed codes, thereby insuring that any newly prepared tape is completely compatible with any original tape in the apparatus.

As operations proceed, the recording of information on the newly prepared tape as it is read from the original tape occurs at a relatively high rate of speed because of the direct transfer of the information, and the newly prepared tape is subjected to control by the printer only in the infrequent cases where the transferred information does not reflect the actual printing or operation of the printer.

The foregoing and other objects, features, and advantages will be more apparent from the following description of the preferred embodiment of the invention as illustrated in the accompanying drawings.

Figure 1:
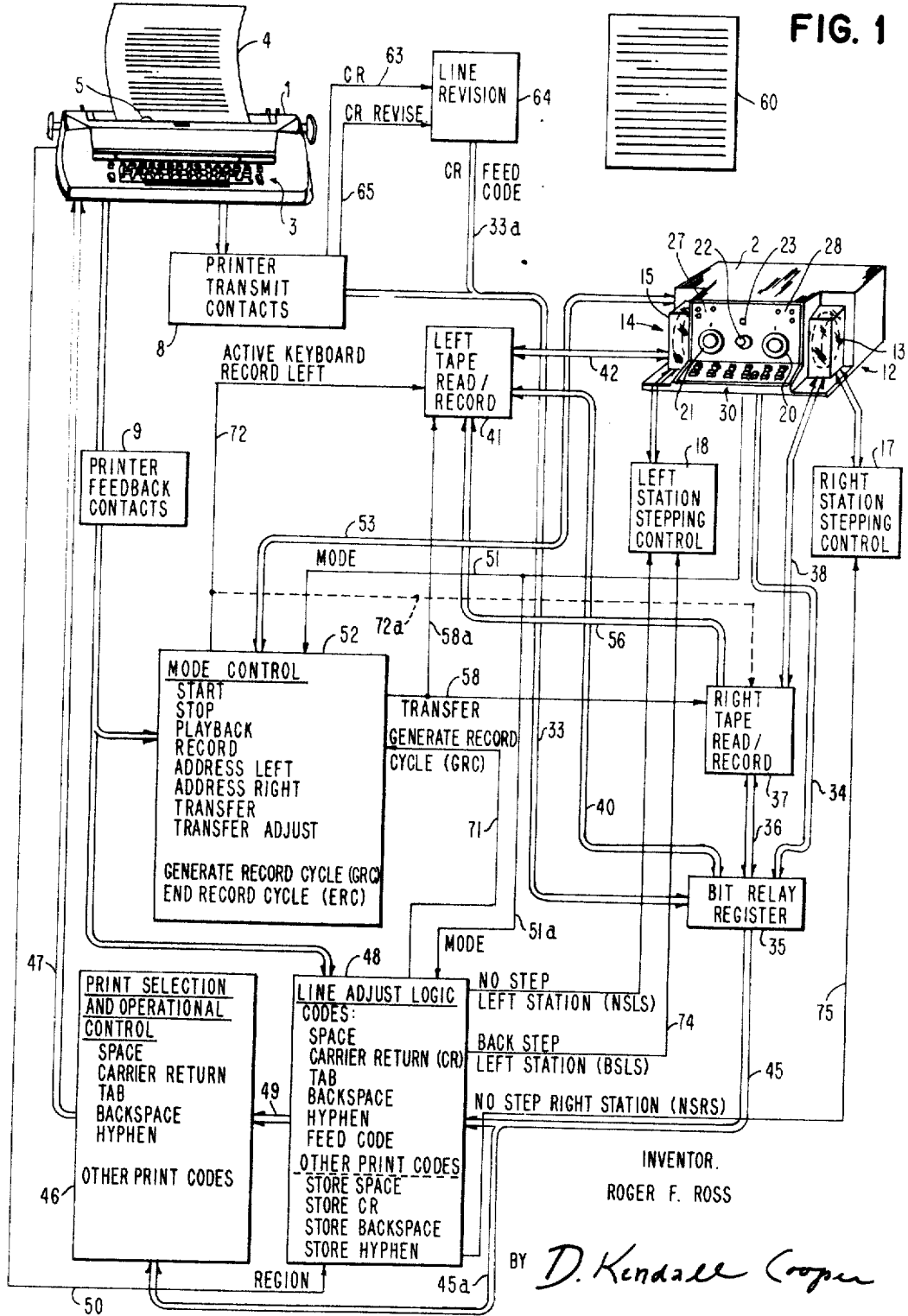
FIG. 1 is a block circuit diagram of a data processing and printing apparatus according to the present invention.

FIGS. 14-30, when arranged as shown in FIG. 31, show detailed circuits involved in various data and control aspects of the apparatus of FIG. 1.

GENERAL DESCRIPTION

FIG. 1 illustrates a suggested arrangement of apparatus for practicing the present invention. The apparatus includes a printer 1 interconnected with a magnetic tape processing unit 2. Printer 1 has the usual keyboard 3 with data keys for effecting printing of characters on a document 4 by operation of a single element print head 5, and functional keys for selecting functional operations, such as Space, Backspace, Carrier Return, and Tab. During the selection of a character for printing, as well as during functional operations, printer transmit contacts in block 8 are operated to establish a coded configuration representative of the printer character or function involved. Also, during operation of printer 1, printer feedback contacts in block 9 are operated to transmit signals for control purposes. The printer feedback contacts included in block 9 are designated C1, C2 Print Feedback contacts, C3 Upper Case contacts, C4 Lower Case contacts, C5 Tab, Space, and Backspace contacts, and C6 Carrier Return contacts. The printer also has Carrier Return interlock contacts and Tab interlock contacts.

Tape unit 2 has a right-hand tape station 12 with a magnetic tape cartridge 13 in position and a left-hand tape station 14 with a magnetic cartridge 15 in position. The tape stations in tape unit 2 include facilities for recording and playing back coded characters on the magnetic tapes in the cartridges 13 and 15, together with various tape loading, winding, rewinding and stepping mechanisms. Right tape station 12 has an associated stepping control block 17 and a comparable stepping control block 18 is provided for left station 14. Tape unit 2 includes a control panel with a mode control knob 20. Mode control knob 20 ordinarily has positions for selecting Left Record, Right Record, Left Playback, Right Playback, Left Adjust, Right Adjust, Transfer Type, and Transfer Adjust. A Start Condition knob 21 controls the amount of data played back and has positions designated Auto Start, Auto, Line, Word, and Character. A Search knob 22 is rotated to select a particular block of information on one of the tapes as indicated in a reference number window 23. A number of indicator lamps at 27 and 28 indicate the status of the equipment. The tape unit also has a number of control and encoding buttons generally indicated at 30. These include buttons designated Start, Stop, Skip, Search, Rewind, Line Return, Load, Backspace Code, Stop Code, Feed Code, Reference Code, Auto Search Code, Stop Transfer Code, Switch Code, and Unload.

Reference is made to the aforementioned patents for a complete description of the various control buttons and other facilities associated with printer 1 and tape unit 2.

Various modes of operation of the apparatus are established, as appropriate, for recording and playing back information, primarily under control of mode control knob 20.

During a Record Left or Record Right mode, data characters and functional characters are supplied from the printer transmit contacts in block 8 by cable 33 or from the data encoding buttons 30 by cable 34 to a bit relay register 35. The coded characters are then directed by cable 36 to the Right Tape Read/Record block 37 and by cable 38 to the right tape in cartridge 13, or by cable 40 to Left Tape Read/Record block 41 and by cable 42 to the left tape in cartridge 15.

During a Playback Left or Playback Right mode of operation, characters read from the right tape pass by cables 36 and 38 and Read/Record block 37, or by cables 40 and 42 and the Read/Record block 41 to bit relay register 35. The characters are then supplied by cable 45 and 45a to the Print Selection and Operational Control block 46 for operating printer 1 by cable 47.

During the Adjust Left, Adjust Right, or Transfer Adjust modes of operation, the characters are supplied by cable 45 to the Line Adjust logic 48 and then by cable 49 to operate the Print Selection and Operational Control block 46 in accordance with the line ending conditions indicated by "Region" signals supplied by line 50 from printer 1.

During a Transfer Type mode, characters are transferred from the right tape to the left tape without adjustment.

Mode control signals from tape unit 2, as established by mode control knob 20, are directed by lines 51 and 51a to the Mode Control block 52 and Line Adjust logic 48, respectively. Various controls of tape unit 2 are exerted by mode control 52 by cable 53. During any Transfer operation, including a Transfer with Typing mode and a Transfer Adjust mode data read at the right-hand station 12 is supplied through the Read/Record block 37 and by cable 56 directly to the left tape Read/Record block 41 for recording on the magnetic tape at the left-hand station 14. Concurrently with the direct transfer of data from the right tape to the left tape, the data is also provided through the bit relay register 35 to the Print Selection and Operational Control block 46 either directly through cable 45a or when in an Adjust mode, through block 48 and cable 49. The Read/Record blocks 37 and 41 are conditioned for a Transfer operation by mode control signals on lines 58 and 58a.

As described in the Locklar et al. Patent 3,260,340, whenever a Carrier Return key is depressed on printer 1 a signal by line 63 controls the line revision circuit 64 to provide both a Carrier Return and a Feed code by cable 33a for recording on the tape selected at station 12 or 14. Later, the Feed code serves as a redundant code to which printer 1 is non-responsive and can be used for expanding the lines of information during revision procedures. Depression of a Carrier Return Revise button on keyboard 3 supplies an indication by line 65 so that the Feed code is not recorded on the tape. Provision is made in the present apparatus as document 4 is prepared to delete the Carrier Return codes and associated Feed codes when they occur outside the line ending Region and to record a Carrier Return code and an associated Feed code whenever a Carrier Return operation is effected in the line ending Region on the new document 4.

Essentially, the operation during a Transfer Adjust mode according to the present invention involves the transfer of data and functional information from the right tape Read/Record block 37 directly to the left tape Read/Record block 41 for recording on the tape at the left-hand station 14. Ordinarily, the Transfer Adjust mode is maintained effective so that the data and functional information applied through the Line Adjust block 48 operates the Print Selection and Operational magnet in printer 1 as required to readjust the lines of information on document 4. Therefore, the characters, both data and functional, read from the right-hand tape station 12 are recorded at the left-hand tape station 14 prior to or concurrently with the related printer action. Whenever a situation is recognized by the Line Adjust logic 48 that requires the revision of the tape at the left-hand station 14, the Line Adjust logic 48 provides a No Step Left Station (NSLS) signal by line 70 to prevent the left-hand tape from stepping. A Generate Record Cycle (GRC) signal by line 71 to mode control 52 is effective to change the mode of the equipment automatically from a Transfer Adjust mode to an Active Keyboard mode indicated by line 72 to establish a Record Left mode of operation for recording characters on the left-hand tape under control of the printer transmit contacts 8. Since the tape at the left-hand station 14 is prevented from stepping, any character generated by the printer transmit contacts 8 is recorded directly over the previously recorded character, thereby effecting an automatic revision of the left-hand tape to reflect the actual printer action. In some cases, it is necessary to revise two character locations on the left-hand tape and a Back Step Left Station (BSLS) signal by line 74 controls stepping block 18 for back stepping the magnetic tape at the left-hand station. It is also necessary at times to read the same character a second time at the right-hand station 12, and a No Step Right Station (NSRS) signal on line 75 effects the necessary control of stepping control block 17.

For reference purposes, the Line Adjust logic described in the Sims patent is set forth below in Table A.

Transfer with typing (1) The tape unit is conditioned to read information at the right tape, simultaneously record it on the left tape, and print it.

(2) All codes on right tape are duplicated on the left tape.

(3) A Search bit read from the right tape results in the typing of a graphic 2.

(4) Auto Search, Switch, and Stop codes are not performed, although they are duplicated on the left tape.

TABLE A.—LINE ADJUST LOGIC

| Code Sequence | Codes on Tape | Typewriter Action | |
|---|---|---|---|
| | | No Line Ending Condition | Line Ending Condition |
| A-1 | Successive Carrier Returns | Space, Successive Carrier Returns. | Normal. |
| A-2 | CR, TAB(S) | SP, CR, TAB(S) | Do. |
| A-3 | CH, SPACE(S), SP, CH | Normal | CH, SPACE(S), SP, CR, CH. |
| A-4 | CH, SPACE(S), CR, CH | CH, SPACE(S), SP, CH | Normal. |
| A-5 | CH, SP, CH | Normal | CH, SP, CR, CH. |
| A-6 | CH, CR, CH | CH, SP, CH | Normal. |
| A-7 | CH, SP, HYP(S), SP, CH | Normal | CH, SP, HYP(S), SP, CR, CH. |
| A-8 | CH, SP, HYP(S), SP, CR, CH. | CH, SP, HYP(S), SP, CH | Normal. |
| A-9 | CH, HYP(S), CH | Normal | CH, HYP(S), CR, CH. |
| A-10 | CH, HYP(S), CR, CH | CH, HYP(S), CH | Normal. |
| A-11 | CH, SP, BSP, HYP, CH | CH, SP, BSP, CH | CH, SP, BSP, HYP, CR, CH. |
| A-12 | CH, SP, BSP, HYP, CR, CH. | CH, SP, BSP, CH | Normal. |
| A-13 | CH, BSP, SP, HYP, CH | CH, BSP, SP, CH | CH, BSP, SP, HYP, CR, CH. |
| A-14 | CH, BSP, SP, HYP, CR, CH. | CH, BSP, SP, CH | Normal. |
| A-15 | CH, TAB | Normal—If tabulation ends beyond end of line, machine stops. | Normal—If tabulation stops beyond end of line, machine stops. |

CH—Designates any print character except hyphen. HYP—Hyphen. SP—Space. CR—Carrier Return. BSP—Backspace.

The code sequences that are encountered during the reading of the tape at the right-hand station are designated A-1 thru A-15 for reference. The action of the printer in response to the codes read from the tape at right-hand station 12 will vary depending upon whether or not the print head 5 has escaped into the line ending Region, as fully described in the Sims application.

For convenience, outlines of several of the operations are set forth below.

Adjust (right or left)

(1) The tape unit is conditioned to read information at the tape addressed.

(2) Either right tape or left tape can be addressed.

(3) The right margin set of the Printer rather than Carrier Return codes on the tape determines actual printer Carrier Returns.

(4) Line Ending Condition (a) The right margin set determines a line ending Region approximately 10 characters wide.

(b) Printing any character in this region establishes the line ending Condition.

(c) The line ending Condition terminates when any one of the following occurs:

(1) A character (except hyphen) prints outside of the line ending region.

(2) The operation selector switch is turned from Adjust.

(5) In each condition the printer reacts to certain codes differently. (Table A).

(6) The requirements for paragraph definition are two Carrier Returns or a Carrier Return followed by a Tab.

(7) Printer keyboard is locked.

(5) Printer keyboard is locked.

The present apparatus is provided with an Active Keyboard mode of operation that is briefly described below:

Active keyboard (1) The tape unit automatically goes into a Record Left mode whenever the transfer operation is stopped by one of the following means;

(a) Depression of the Stop button.

(b) Transferring a Stop Transfer code.

(c) Normal stop due to transferring a "character," "word," or "line."

(2) The tape unit remains in a stopped transfer mode of the "Transfer" operation is stopped by transferring a Playback error. The keyboard is locked.

(3) Depressing the "Start" button automatically starts Transfer operation.

(4) Depressing the "Skip" button causes skipping on the Right Station only.

In certain versions of the equipment, transfer of information may be effected without typing as indicated below:

Transfer without typing (1) The tape unit is conditioned to read information from the right tape and record it on the left tape.

(2) All codes on the right tape are duplicated on the left tape.

(3) Printing is suppresssed.

(4) The printer keyboard is locked.

(5) The machine will stop and the keyboard is unlocked by transferring a "Character," "Word," or "Line," transferring a "Stop Transfer" code or depressing the Stop button.

(6) Transferring a parity error stops the machine. The keyboard remains locked.

The Transfer Adjust operation according to the present invention is outlined below:

Transfer adjust with code conversion (1) The tape unit is conditioned for the transfer operation as outlined above.

(2) Active Keyboard as described above also applies to Transfer Adjust.

(3) The right margin set of the printer, rather than Carrier Return codes on the right tape, determines printer Carrier Returns and the location of Carrier Return codes on the left tape.

(4) Line Ending Condition is defined above.

(5) All codes on the right tape are duplicated on the left tape with the following exceptions:

(a) A single Carrier Return code sensed while the machine is not in a line ending condition, is converted to a Space code or omitted, whichever is applicable.

(b) If a Space code followed by a print character (except hyphen) is sensed while the machine is in a line ending condition, the Space code is converted to a Carrier Return code and a Feed code.

(c) Feed codes are not transferred unless they are preceded by a Carrier Return code on the left tape.

(6) Paragraph definition requirements are stated above.

(7) Table B summarizes the printed action and code conversion for the conditions and code sequences of Table A.

deletions, and corrections, as required. As illustrated, document 4 combines the first two independent paragraphs in document 60 into a single paragraph. It is further assumed that the length of the lines on document 4 differ from the lengths of the lines on document 60. Accordingly, it is necessary for the equipment to be placed in a Transfer Adjust mode in order that the equipment will be make appropriate adjustment of the printed lines on document 4 while utilizing the data signals representative of document 60 and recorded on the tape at the right-hand station 12.

To illustrate the types of changes encountered during an operation of this nature, it is assumed that the first two paragraphs in document 60 reads as follows:

Original document

This document contains the proposed Functional specifications to include the features "Transfer Adjust with Code Conversion, Hot Keyboard and Repeat Hyphen Adjusting."

MT/ST's equipped with these optional features will require changes in certain designated paragraphs of the MT/ST Functional Specifications.

The information for document 60 recorded on the right-hand original tape is as follows:

Original tape (right station)

(Tab) This (SP) document (SP) contains (SP) the (SP) proposed (CR) (Feed)

TABLE B

| Code Sequence | Right Tape Code Sequence | No Line Ending Condition | | Line Ending Condition | |
|---|---|---|---|---|---|
| | | Typewriter Action | Left Tape Code Sequence | Typewriter Action | Left Tape Code Sequence |
| B-1 | Successive Carrier Returns. | Space, Successive Carrier Returns. | Normal [1] | Normal | Normal. |
| B-2 | CR, TAB(S) | SP, CR, TAB(S) | do [1] | do | Do. |
| B-3 | CH, SPACE SP, CH | Normal | do | CH, SPACE(S), SP, CR, CH. | CH, SPACE(S), CR, CH.[1] |
| B-4 | CH, SPACE(S), CR, CH. | CH, SPACE(S), SP, CH. | CH, SPACE(S), SP, CH. | Normal | Normal. |
| B-5 | CH, SP, CH | Normal | Normal | CH, SP, CR, CH | CH, CR, CH.[1] |
| B-6 | CH, CR, CH | CH, SP, CH | CH, SP, CH [2] | Normal | Normal. |
| B-7 | CH, SP, HYP(S), SP, CH. | Normal | Normal | CH, SP, HYP(S), SP, CR, CH. | CH, SP, HYP(S), SP, CR, CH.[1] |
| B-8 | CH, SP, HYP(S), SP, CR, CH. | CH, SP, HYP(S), SP, CH. | CH, SP, HYP(S), SP, CH.[2] | Normal | Normal. |
| B-9 | CH, HYP(S), CH | Normal | Normal | CH, HYP(S), CR, CH | CH, HYP(S), CR, CH.[1] |
| B-10 | CH, HYP(S), CR, CH | CH, HYP(S), CH | CH, HYP(S), CH [2] | Normal | Normal. |
| B-11 | CH, SP, BSP, HYP, CH. | CH, SP, BSP, CH | Normal | CH, SP, BSP, HYP, CR, CH. | CH, SP, BSP, HYP, CR, CH.[1] |
| B-12 | CH, SP, BSP, HYP, CH. | CH, SP, BSP, CH | CH, SP, BSP, HYP, CH. | Normal | Normal. |
| B-13 | CH, BSP, SP, HYP, CH. | CH, BSP, SP, CH | CH, BSP, SP, HYP, CH. | CH, BSP, SP, HYP, CR, CH. | CH, BSP, SP, HYP, CR, CH.[1] |
| B-14 | CH, BSP, SP, HYP, CR, CH. | CH, BSP, SP, CH | CH, BSP, SP, HYP, CH.[2] | Normal | Normal. |
| B-15 | CH, TAB | Normal—If tabulation ends beyond end of line, machine stops. | Normal | Normal—If tabulation stops beyond end of line, machine stops. | Do. |

[1] The first Carrier Return in these sequences will be generated and will be followed by a Feed code.
[2] Feed codes in these sequences will be omitted.

Table B indicates the printer action and the left tape code sequence that is established in response to various code sequences on the tape at the right-hand station 12, FIG. 1, when the print head 5 is in the line ending Region or not in the line ending Region. The code sequences are designated B-1 through B-15 to relate them to the corresponding code sequences A-1 thru A-15 previously shown in Table A for the line adjust operation as described in the aforementioned patent applications.

In order to illustrate the present inventive arrangements, it is assumed that an original document 60 with several independent paragraphs of information has been recorded on the tape at the right-hand station 12. It is now desired to prepare a new document containing most of the information in document 60, but having additions, Functional (SP) Specifications (SP) to (SP) include (SP) the (CR) (Feed)
features (SP) "Transfer (SP) Adjust (SP) with (SP) Code (CR) (Feed)
Conversion, (SP) Hot (SP) Keyboard (SP) and (SP) Repeat (CR) (Feed)
Hyphen (SP)Adjusting." (CR) (Feed) (CR) (Feed)
(Tab) MT/ST's (SP) equipped (SP) with (SP) these (SP) optional (CR) (Feed)
features (SP) will (SP) require (SP) changes (SP) in (SP) Cer (SP) (BSP)–(CR) (Feed)
tain (SP) designated (SP) paragraphs (SP) of (SP) the (SP) MT/ST/ (CR) (Feed)
Functional (SP) Specifications. (CR) (Feed) (CR) (Feed)

It is now desired to prepare a revised copy in the form of document 4 from the original paragraphs and the revised document reads as follows:

Revised document

This document contains the
proposed Specifications to include
the features "Transfer Adjust
with Code Conversion, and Active Key-
board." Magnetic Tape Units
equipped with these optional features
will require changes in paragraphs
8.3 through 8.7 of the basic
Specifications.

An inspection of the original two paragraphs and the revised single paragraph indicates that a number of words were deleted, a number of words were added, and the two original paragraphs are now combined into a single paragraph. The net effect of the foregoing revision is to reposition the line endings in the printed material. In an Adjust mode, the repositioning is handled automatically on the printed document 4. However, the bulk of the information in the original two paragraphs is transferred essentially unmodified to the left-hand tape at station 14, FIG. 1. That is, the original Carrier Return Codes will be recorded on the left-hand tape as they are read from the right-hand tape. Therefore, during normal Transfer operations, the left-hand tape will contain various codes that differ from the material actually printed on document 4, and the actual printer operations.

In the foregoing example, the material actually recorded in the left-hand tape without code conversion is as follows:

Revised tape (left station) without code conversion (Tab) This (SP) document (SP) contains (SP) the (SP) proposed (CR) (Feed) Specifications (SP) to (SP include (SP)
the (CR) (Feed) features (SP) "Transfer (SP) Adjust (SP) with (SP)
Code (CR) (Feed) Conversion, (SP) and (SP) Active (SP) Key (SP) (BSP)–(CR) (Feed
board." (SP) (SP) Magnetic (SP) tape (SP) Units (CR) (Feed)
equipped (SP) with (SP) these (SP) optional (CR) (Feed) features (SP)
will (SP) require (SP) changes (SP) in (SP) paragraphs (CR) (Feed)
8.3 (SP) through (SP) 8.7 (SP) of (SP) the (SP) basic (CR) (Feed)
Specifications. (CR) (Feed) (CR) (Feed)

As shown, the line endings identified by (CR) (Feed) do not correspond to the line endings of the revised document, and the revised tape is usable only in an Adjust mode of operation.

Provision is made in the present inventive arrangements to revise any codes in the tape at the left-hand station 14, FIG. 1, when they differ from the actual printing or operational situations encountered as document 4 is prepared. The revised left tape with code conversion should appear as follows:

Revised tape (left station) with code conversion (Tab) This (SP) document (SP) contains (SP) the (CR) (Feed)
proposed (SP) Specifications (SP) to (SP) include (CR) (Feed)
the (SP) features (SP) "Transfer (SP) Adjust (CR) (Feed)
with (SP) Code (SP) Conversion, (SP) and (SP) Active (SP) Key (SP) (BSP)—(CR) (Feed)
board. (SP) (SP) Magnetic (SP) Tape (SP) Units (CR) (Feed)
equipped (SP) with (SP) these (SP) optional (SP) features (CR) (Feed)
will (SP) require (SP) changes (SP) in (SP) paragraphs (CR) (Feed)
8.3 (SP) through (SP) 8.7 (SP) of (SP) the (SP) basic (CR) (Feed)
Specifications. (CR) (Feed) (CR) (Feed)

DETAILED CIRCUITS

Reference is made to the Sims patent for a detailed description of the various modes of operation of the basic apparatus including Record Left, Record Right, Playback Left, Playback Right, Adjust Left, Adjust Right, Transfer Adjust, and Transfer Type. Some circuit changes have been made including the renaming or renumbering of the various relays in the machine circuits. However, the basic operations of the present apparatus are similar in many respects to the operations disclosed in the Sims patent. Only so much of the detailed circuits as are believed necessary for an understanding of the present invention are incorporated in the present case. For convenience, the figure numbers of the present case and the Sims Patent 3,297,124 containing comparable circuits is indicated below:

| U.S. Patent Figure No. | Present Application Figure No. |
|---|---|
| 24–26 | 14 |
| . | 15 |
|  | 16 |
|  | 17 |
| 27, 28 | 18 |
|  | 19 |
| 30, 31 | 20 |
| 31 | 21 |
|  | 22 |
| 35, 36 | 23 |
| 32, 37 | 24 |
| 36 | 25 |
| 38 | 26 |
| 37 | 27 |
| 18 | 28 |
|  | 29 |
|  | 30 |

Also, for reference, the original relay numbers and the relay numbers in the present case, together with the relay names are shown in Table C:

TABLE C

Figure 14:
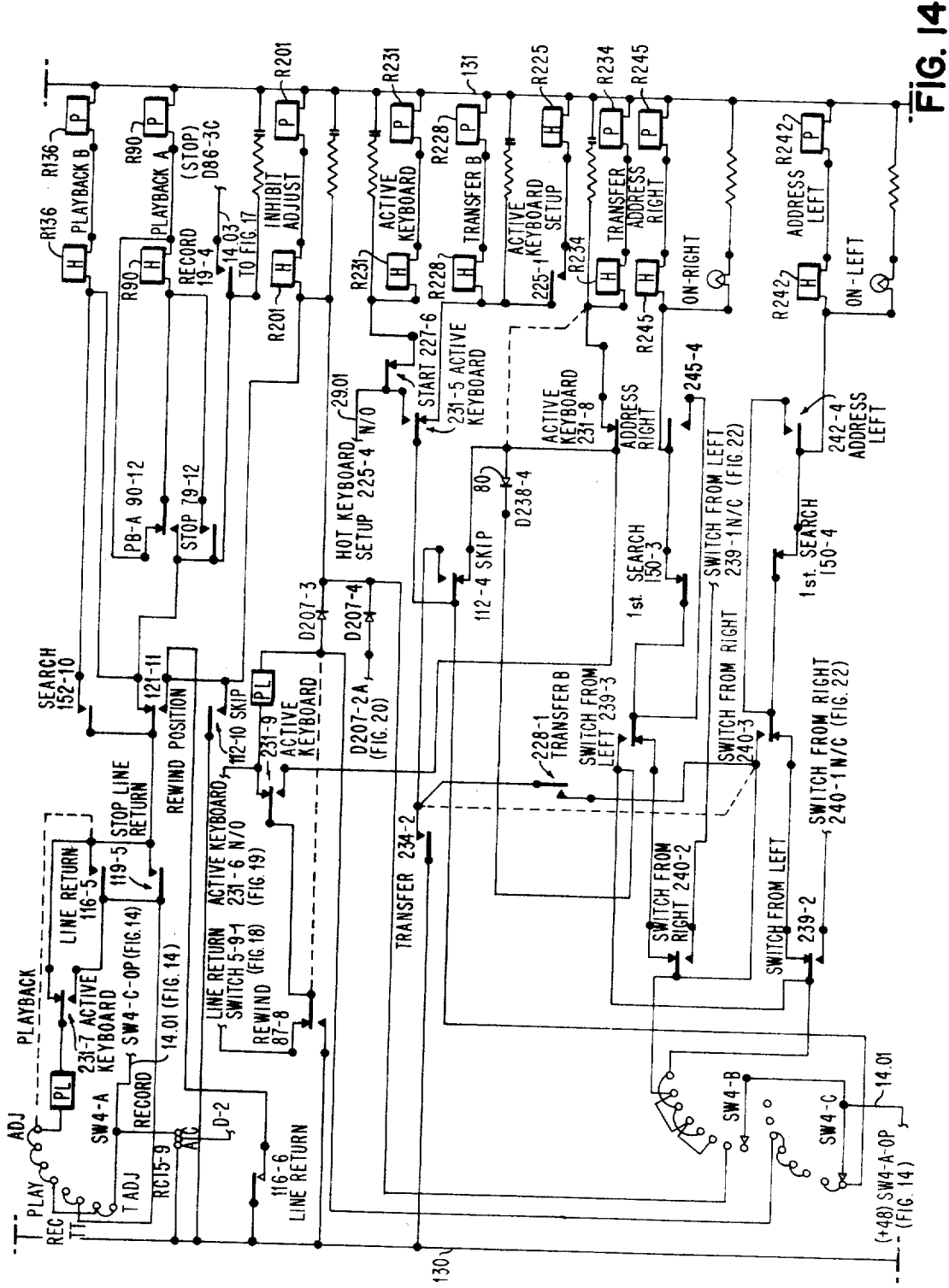

| Original Relay No. | Revised Relay No. | Relay Name | Location |
|---|---|---|---|
| 3 | 19 | Record | Fig. 18 |
| 34 | 22 | Collector Control | Fig. 16 |
|  | 37 | 8-Bit |  |
|  | 40 | 7-Bit |  |
|  | 43 | 6-Bit |  |
| 47 | 46 | 5-Bit |  |
| 50 | 49 | 4-Bit | FIG. 28 |
|  | 53 | 3-Bit |  |
|  | 56 | 2-Bit |  |
|  | 59 | 1-Bit |  |
|  | 63 | Character Stored | FIG. 22 |
| 69 | 65 | C R Interlock | FIG. 19 |
| 71 | 68 | C R Feed | FIG. 19 |
| 73 | 70 | Encode Backspace | FIG. 24 |
| 75 | 73 | Backspace | FIG. 24 |
| 77 | 76 | Character Stored |  |
| 80 | 79 | Stop | FIG. 17 |
| 85 | 82 | Feed | FIGS. 17, 21 |
|  | 87 | Rewind |  |
|  | 90 | Playback—A | FIG. 14 |
|  | 101 | Load |  |
| 66 | 103 | One Cycle | FIG. 15 |
| 111 | 107 | Record Error | FIG. 24 |
| 112 | 109 | Playback Error | FIG. 17 |
|  | 110 | Playback Error | FIG. 24 |
| 114 | 112 | Skip | FIGS. 15, 17 |
|  | 116 | Line Return | FIG. 18 |
|  | 119 | Stop Line Return | FIG. 18 |
|  | 121 | Rewind Position | FIG. 15 |
| 141 | 136 | Playback—B | FIG. 14 |
| 145 | 139 | Stop Search |  |
| 147 | 143 | Search Code | FIGS. 21, 22 |
| 148 | 146 | Reset |  |
|  | 150 | 1st Search |  |

TABLE C—Continued

| Original Relay No. | Revised Relay No. | Relay Name | Location |
|---|---|---|---|
| 151 | 152 | Search | |
| | 158 | 4 Tens | |
| | 161 | 2 Tens | |
| | 164 | 1 Ten | |
| | 167 | Ring 2 | |
| | 170 | Ring 1 | |
| | 173 | 8 Units | |
| | 176 | 4 Units | |
| | 180 | 2 Units | |
| | 183 | 1 Unit | |
| | 193 | No Step Left Station (NSLS). | FIGS. 29, 30 |
| | 194 | End Record Cycle (ERC) | FIG. 29 |
| | 196 | Inhibit Start | FIGS. 29, 30 |
| | 198 | Generate Record Cycle (GRC). | FIG. 29 |
| 98 | 201 | Inhibit Adjust | FIG. 14 |
| 101 | 204 | Read CR | FIGS. 21, 26 |
| 102 | 206 | CR No Step | FIG. 20 |
| 103 | 208 | Store CR | FIG. 26 |
| 104 | 209 | Repeat CR, Tab | FIG. 26 |
| 106 | 211 | Store SP, Backspace | FIGS. 18, 26 |
| | 213 | Store Hyphen | FIGS. 20, 26 |
| 108 | 214 | Region | FIG. 26 |
| | 225 | Active Keyboard Setup | FIG. 30 |
| | 227 | Start | FIG. 30 |
| | 228 | Transfer "B" | FIG. 14 |
| | 231 | Active Keyboard | FIG. 14 |
| 203 | 234 | Transfer | FIG. 14 |
| 207 | 239 | Switch From Left | FIG. 22 |
| 208 | 240 | Switch From Right | FIG. 22 |
| 209 | 241 | Switch Cycle | FIGS. 21, 23 |
| 211 | 242 | Address Left | FIG. 14 |
| 214 | 245 | Address Right | FIG. 14 |

Table C indicates the various relays involved in all of the operations of the apparatus, including those operations described in the Sims patent, and in the present application. Table C provides a listing of the figure numbers in the present case where the relays may be found, when the relays are actually included in the drawings of the present case.

TRANSFER ADJUST WITH CODE CONVERSION

To illustrate the present invention, it is assumed that the mode control knob 20, FIG. 1, has been positioned to the Transfer Adjust mode, thereby gating mode control block 52 and Line Adjust logic 48 by lines 51 and 51a, FIG. 1. It is further assumed that data transfer and printing operations are initiated by depression of the Start button and that data is transferred from the right to the left tape by cable 56 as well as to printer 1 by cable 47, with appropriate controls from the Line Adjust block 48, as required.

During the preparation of document 4 and the left tape at station 14 from the data on document 60 as recorded on the right tape at station 12, the apparatus monitors the data as it is read from the right tape and recorded on the left tape in order to determine if the coded combinations should be changed according to the code sequences in Table B.

FIGS. 2–13 illustrates some of the logical considerations involved during the Transfer Adjust operation with Code Conversion. The circuits are shown in FIGS. 14–30. A +48 volt potential is available from line 130 to ground line 131, FIGS. 14–30. Certain wiring, required in the basic apparatus disclosed in the patents and shown in dashed form, is to be omitted in the present inventive arrangements.

Similarity of procedures for different code conditions

The logical procedures followed are generally applicable to a number of different code sequences encountered during the Transfer Adjust operation. Referring to Table B, two primary examples of the code sequences that may be encountered during a Transfer Adjust operation are the B–5 sequence comprising Character, Space, Character, and the B–6 sequence comprising Character, Carrier Return, and Character. If the two sequences mentioned are encountered, it is necessary to control the printer and the recording of the left tape in a particular manner. As shown in Table B for sequence B–5, the printer action is Character, Space, Carrier Return, and Character when a line ending condition is present. The left tape code sequence should become Character, Carrier Return, and Character and as noted by the asterisks in Table B the first Carrier Return code in the sequence is to be followed by a Feed code on the left tape. This is generally controlled by Relay R206, FIG. 21, that is energized for the B–5 sequence in Table B.

Referring to code sequence B–6 in Table B, whenever this code sequence, which involves a Carrier Return code, is encountered outside the line ending Region, it is necessary to convert the Carrier Return code to a Space code for the printer and to record a Space code on the left tape. Also, as noted by the double asterisks in connection with sequence B–6 in Table B, any Feed codes in the sequences are to be omitted. The energization of relay R204, FIG. 21, reflects the fact that a Carrier Return code is read outside the line ending Region.

SEQUENCE B–6, CONVERSION OF CARRIER RETURN CODE (RIGHT TAPE) TO SPACE CODE (LEFT TAPE)

Because sequence B–6 is a simpler sequence, it will be discussed prior to sequence B–5. The procedure involves the conversion of any Carrier Return code on the right tape encountered outside the Region to a space action by the printer, and a Space code on the left tape. Also, sequence B–1, involving successive Carrier Return codes is discussed in connection with sequence B–6.

The procedure is set forth in flow charts, FIGS. 2, 3, 4, 5, 6, and 7.

Figure 2:
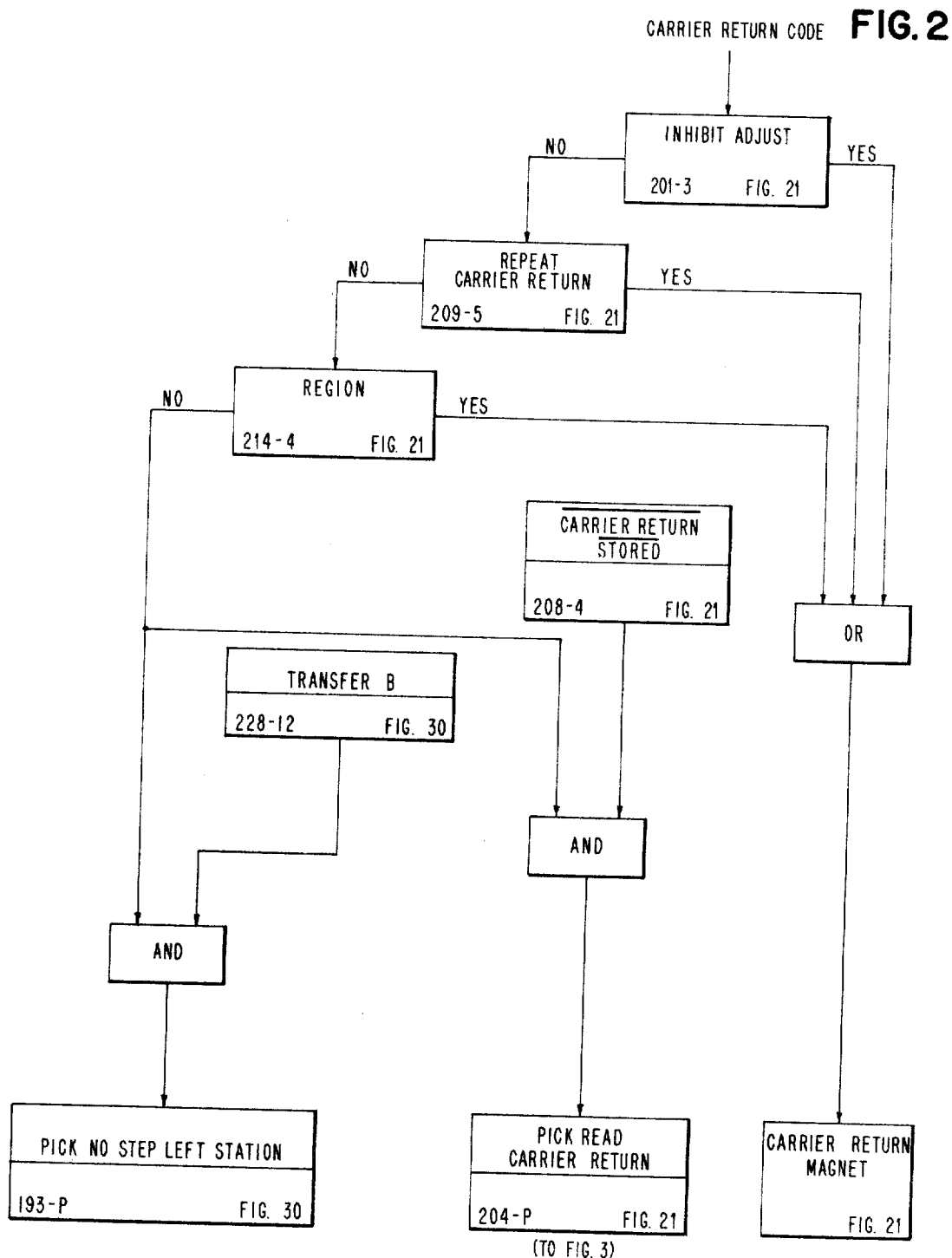
FIGS. 2–13 are flow charts depicting various data handling and control situations encountered in the apparatus during operation.

The handling of the Carrier Return (CR) code is illustrated beginning in FIG. 2. When a Carrier Return code is recognized in the bit relay register 35 by Line Adjust logic 48, FIG. 1, several determinations are made. When the apparatus is not in an Adjust mode, relay R201, FIG. 14, is energized. In the present Adjust mode, relay R201 is de-energized, and the 201–3 points, FIG. 21, are in the normally closed condition shown. In the event two Carrier Return codes occur in sequence, the Repeat Carrier Return R209, FIG. 26, is energized. It is assumed in the present example, that this is a single Carrier Return code encountered during the Transfer Adjust operation. In this case, the 209–5 point, FIG. 21, is in its normally closed condition. A determination is made logically whether the print head 5 is in the line ending Region or not, as determined by a signal on line 50, FIG. 1. Whenever print head 5 enters the line ending Region, comprising about the last ten characters in any line on printer 1, the Region relay R214, FIG. 26, is energized. If the Carrier Return code occurs when print head 5 is in the Region, the 214–4 points, FIG. 21, transfer and direct a signal to the Carrier Return magnet, FIG. 21, to effect a Carrier Return operation of the printer.

To illustrate the data handling and code conversion aspects of the present apparatus, it is assumed that the Carrier Return code is encountered while print head 5 is not in the line ending Region. In this case, the 214–4 points, FIG. 21, are in their normally closed condition.

No step left station (NSLS) and read carrier return (CR)

If the Carrier Return code is recognized when the print head 5, FIG. 1, is not in the line ending Region, provision is made for preventing the tape at the left station from stepping by a signal on the No Step Left Station (NSLS) line 70, FIG. 1. Also, the recognition of the Carrier Return code picks the Read Carrier Return relay R204, FIG. 21. The No Step Left Station relay R193 has a pick coil in FIG. 29, and a hold coil in FIG. 30.

Generate record cycle, stop, and active keyboard setup

Figure 3:
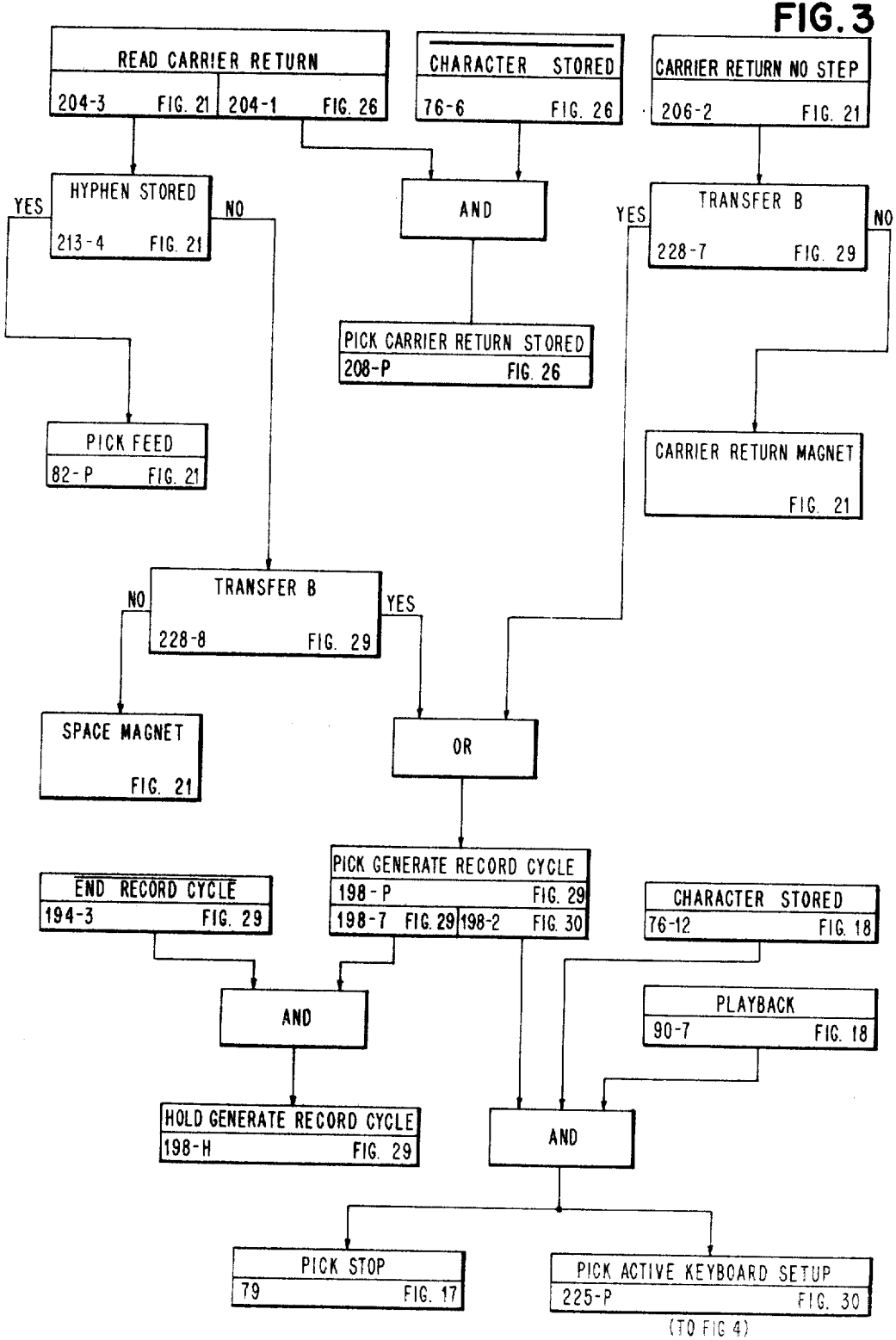

The logic now provides for initiating a Record cycle at the left tape station 14, FIG. 1. The initiation of a Record cycle for the left station stops the Transfer operation and initiates an automatic change in the mode of the apparatus from a Transfer Adjust mode to an Active Keyboard (AK) mode. The flow chart in FIG. 3 illustrates several situations that may be encountered. When a Carrier Return code is recognized as evidenced by the energization of relay R204, FIG. 21, the relay R208, Carrier Return Stored, FIG. 26 is subsequently energized at the end of the cycle in which the Carrier Return code is processed. This end of the cycle is evidenced by the 76–6 point, FIG. 26, being in its normally closed condition. A test is also made to determine if a hyphen had previously been recognized. If this is the case, relay points 213–4, FIG. 21, are transferred, and this provides a path for energizing the Feed relay R82, FIG. 21, in order to initiate a Feed cycle of the tape unit only, rather than to initiate a Record cycle and the change in mode just mentioned.

If no hyphen is stored, as in the present case, the 213–4 point, FIG. 21, will be in its normally closed condition and the same impulse that picked relay R204, FIG. 21, is directed by line 21.01, through the 228–8 points, FIG. 29, to energize the Generate Record Cycle relay R198. The 198–7 points, FIG. 29, are Anded with a Not End Record Cycle Condition as indicated by points 194–3 being normally closed, FIG. 29, to hold the Generate Record Cycle Relay in FIG. 29.

During a Transfer or Transfer Adjust operation, relay R90, FIG. 14, is energized. Therefore, the 90–7 contacts, FIG. 18, are transferred The potential from line 130 is directed through the 90–7 contacts, the 76–12 contacts, and by line 18.01 to FIG. 30, through the 198–2 contacts, now closed, to pick the Active Keyboard Setup relay R225, FIG. 30. The same potential is applied by line 30.01 to pick the Stop relay R79, FIG. 17.

Also, the potential is directed by line 30.02 to pick the Collector Control relay R22. The energization of relay R22 insures that the printer 1, FIG. 1, is in a Shift Down mode in the event that the last character printed had been an upper case character. Relay R22 holds until the printer 1 performs the Shift Down operation.

Mode change from transfer adjust to active keyboard and record left

Figure 4:
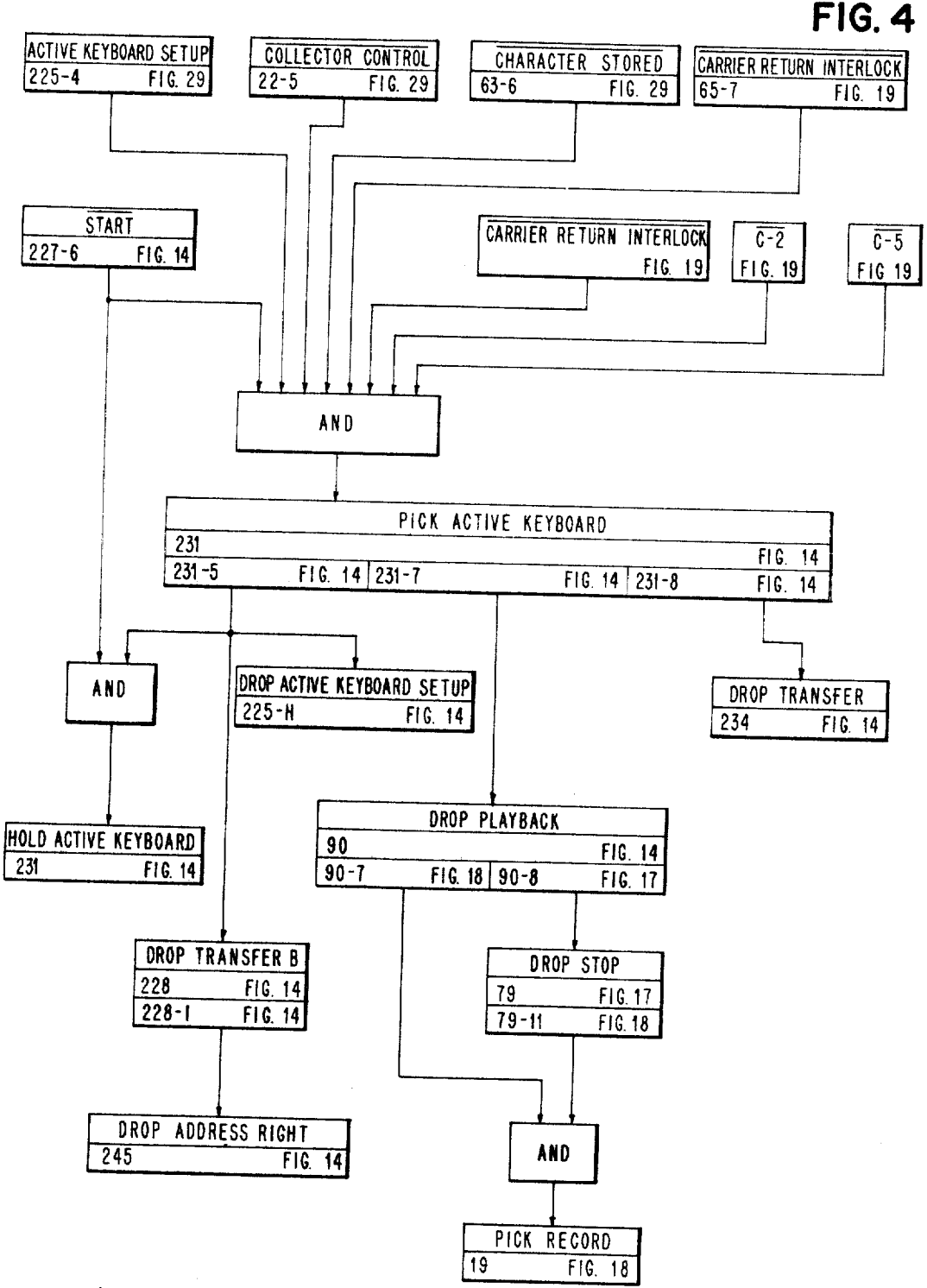

FIG. 4 shows the logic involved in establishing an Active Keyboard mode, dropping the Transfer mode temporarily, and picking the Record Left Relay. A number of conditions are necessary in order to pick relay R231, FIG. 14. The potential from line 130, FIG. 19, proceeds through the printer cams C–2, C–5, the Carrier Return Interlock contacts, the 65–7 Carrier Return Interlock contacts, and by line 19.01 to FIG. 29, through the various points designated 63–6, 22–5, 225–4, now transferred, by line 29.01 to FIG. 14, and through the 227–6 points to pick the Active Keyboard relay R231. When Active Keyboard relay R231 becomes energized, the 231–5 points, FIG. 14, open, thereby dropping the Active Keyboard Setup relay R225, FIG. 14. The transfer of the 231–5 contacts also drops the Transfer "B" relay R228, FIG. 14, thereby taking the apparatus out of the Transfer mode. Also, in FIG. 14, the Address Right relay R245 is dropped due to the opening of the contacts 228–1, FIG. 14. The Address Right relay R245 was previously held through the Transfer points 234–2, the 228–1 points, the 240–2 points, the 239–3 points, and the 150–3 points.

In FIG. 14, when the Active Keyboard relay R231 picks, the 231–7 points transfer and remove potential from Playback relay R90, thereby dropping relay R90. The 90–8 points in FIG. 17 returning to their normally closed condition drops the Stop relay R79. The 79–11 contacts, FIG. 18, together with the 90–7 contacts pick the Record relay R19, FIG. 18. This establishes a Record mode of operation.

Even though the Address Right relay R245 is de-energized, the Address Left Relay R242, FIG. 14, is maintained energized by the following path. Potential from line 130, FIG. 14, is directed to the Switch 4–A terminal and by line 14.01 to the Switch 4–C section which is in the Transfer Adjust position, as shown. The path continues through the 112–4 contacts, closed, and loops back through a diode 80, through the 239–2 points, the 240–3 points, the 242–4 points to hold relay R242 energized.

Conversion of carrier return code to space code

Figure 5:
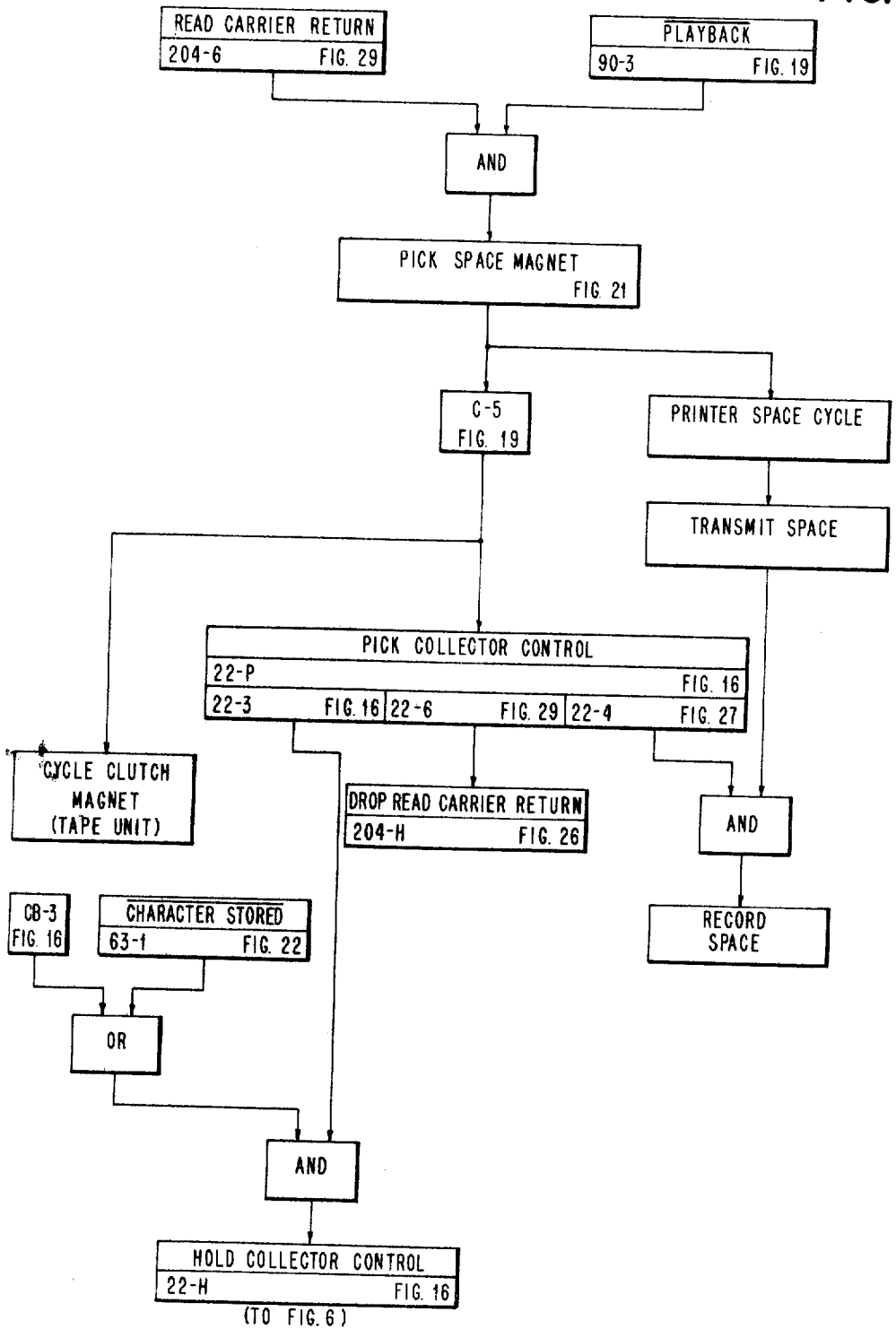
Figure 6:
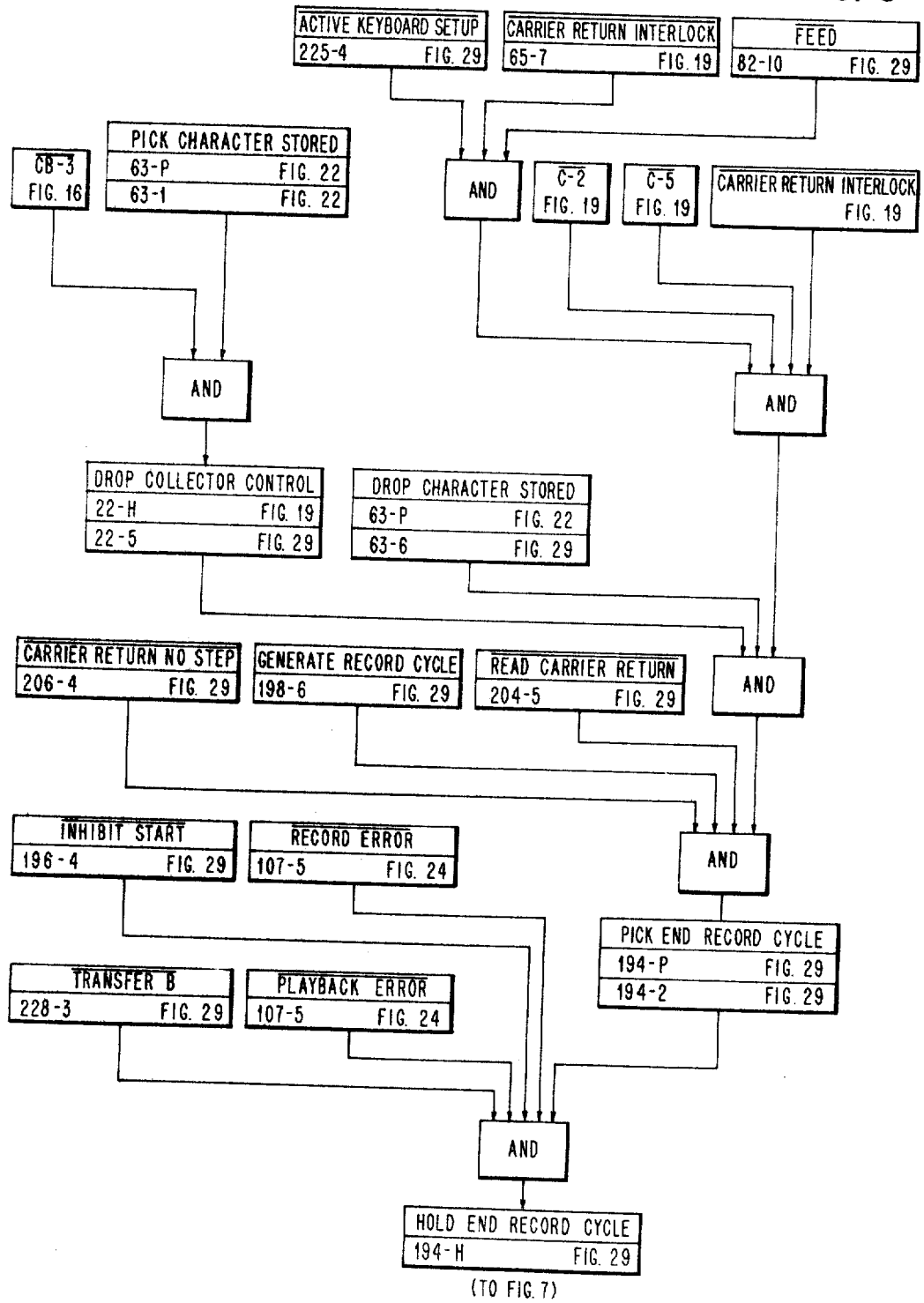
Figure 7:
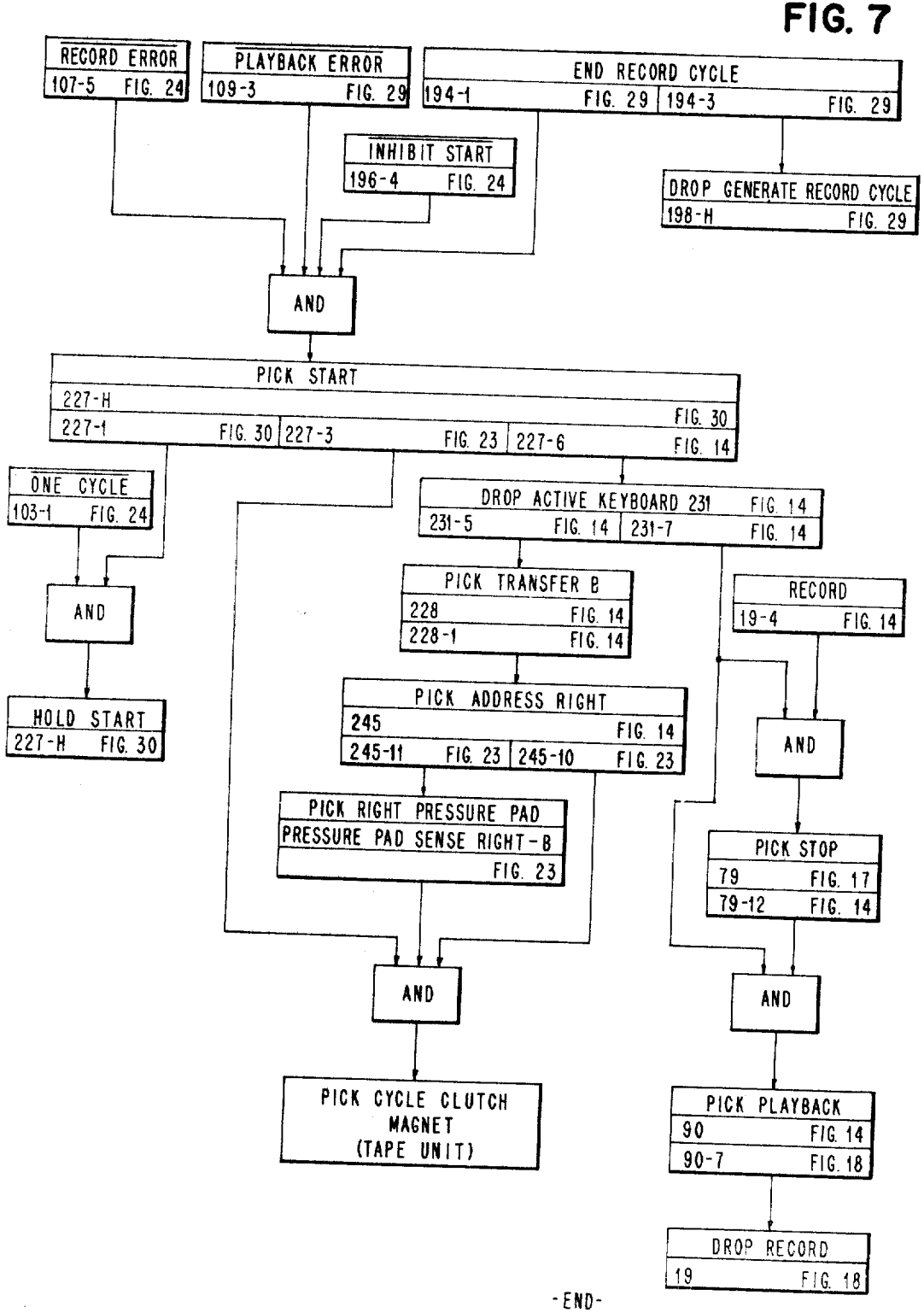

FIGS. 5, 6 and 7 show the remaining logic for converting the Carrier Return code outside the Region to a Space code on the left tape and for restarting the Transfer Adjust operation.

The path for energizing the Space magnet, FIG. 21, is as follows.

Potential from line 130, FIG. 19, passes through the printer contacts C–2, C–5, C–6, the 90–3 Playback points by line 19.02 to FIG. 29, through the 204–6 contacts, now transferred, and by line 29.02 to the Space magnet FIG. 21. Energization of the Space magnet effects a printer space operation during which time the C–5 contacts, FIG. 19, are transferred. The Space operation closes various ones of the printer transmit contacts in block 8, FIG. 1, to transmit the Space code by cable 33 to the bit relay register 35.

Concurrently with this the Collector Control relay R22, FIG. 16, is energized through the following path. Potential is supplied from line 130, FIG. 19, through the C–5 contacts when they transfer during the printer cycle, by line 19.03 to FIG. 16, line 16.01 to FIG. 17, line 17.01 returning to FIG. 16, contacts 79–8, circuit breaker CB–5 in printer 1, contacts 90–6, to relay R22, FIG. 16.

The 22–4 points, FIG. 27, supply an impulse by line 27.01 through the printer contacts to effect the recording of the Space code on the left-hand tape at station 14, FIG. 1.

Transfer of the 22–6 points, FIG. 29, opens the hold circuit for relay R204 by line 29.03, FIGS. 29 and 26.

At the same time that Collector Control relay R22 is picked, the impulse from circuit breaker CB–5 is applied to the cycle clutch in the tape unit 2 to initiate a recording cycle in the unit. The Collector Control relay R22 is held from line 130, FIG. 22 by line 22.01 to the 198–4 contacts, FIG. 16, and by contacts 19–12, now transferred and the 22–3 points to the hold coil, FIG. 16.

FIG. 6 is a flow chart representing various conditions that are taken into account for ending the Record cycle by energizing the End Record Cycle Relay 194, FIG. 29.

As shown in FIG. 6, the end of the printer cycle is indicated by the normal condition of printer contacts C–2, C–5, and the Carrier Return Interlock contacts, FIG. 19. The Collector Control relay R22 is dropped when the 63–1 points, FIG. 22, transfer due to a character having been stored in the bit relay register 35, FIG. 1. The Character Stored relay R63 is transfered only temporarily and the 63–6 point, FIG. 29, is again closed as shown. An impulse again becomes available by line 19.01 from FIG. 19 to FIG. 29, through the Active Keyboard Setup contacts 225–4, now in their normally closed condition, and through a series of contacts 82–10, 206–4, 204–5, and 198–6 to pick relay R194. Relay R194 is held in FIG. 29 by the following path. The potential from line 130 is supplied through the 107–5 contacts, normally closed, FIG. 24, by line 24.01 to FIG. 29, the 109–3 points, the 196–4 points, Transfer B points 228–3, and the End Record Cycle contacts 194–2 to the End Record Cycle hold coil, FIG. 29.

FIG. 7 illustrates the restarting of the Transfer Adjust operation. This is primarily under control of various End Record Cycle contacts, FIG. 29. The 194–3 points, FIG. 29, drop the Generate Record Cycle relay R198, when they transfer. The Start relay R227 is picked in FIG. 30 through its hold coil by line 29.04 from FIG. 29, through the 194–1 contacts, now transferred. The Start relay R227 is held from the One Cycle relay contacts 103–1, FIG. 24, by line 24.02, and through the contacts 227–1, now transferred.

Opening of the Start contacts 227–6, FIG. 14, drops the Active Keyboard relay R231. The 231–5 contacts, FIG. 14 pick the Transfer "B" relay R228. The 228–1 points closing, FIG. 14, pick the Address Right relay R245. In FIG. 23, the 245–11 contacts are effective to pick the right pressure pad in the tape unit 2, thereby closing the Pressure Pad Sense Right B contacts, FIG. 23. The path for energizing the clutch in the tape unit is through the following contacts. Address Right 245–10, now transferred, FIG. 23, 227–3 contacts, now transferred, by line 23.01 to FIG. 30, by line 30.03 to FIG. 15, the 19–5 contacts, the 143–1 contacts, the 76–5 contacts, the 103–12 contacts, by line 15.01 to FIG. 16 and by way of circuit breaker CB–5, contacts 87–12, to the cycle clutch, FIG. 16.

Concurrently with the energization of the cycle clutch in the tape unit, Stop relay R79, FIG. 17, is energized from line 130, FIG. 14, the switch 4–A section, 231–7 contacts, normally closed, 121–11 contacts, normally closed, and the 19–4 contacts by line 14.03 to FIG. 17. From there the path continues through the 206–3 contacts to the Stop coils, FIG. 17. Picking of the Stop relay R79 transfers the 79–12 contacts, FIG. 14, to the Playback relay R90, FIG. 14. Energization of the Playback relay R90 opens contacts 90–7, FIG. 19 to drop the Record relay R19.

As just described in detail, the Carrier Return code encountered outside the line ending Region has been converted to a Space action by the printer 1 and to a Space code on the left-hand tape at station 14, FIG. 1.

SUCCESSIVE CARRIER RETURN CODES

An interesting aspect of the operation of the present equipment occurs with a double or multiple Carrier Return code sequence on the right tape, sequence B–1, Table B. Upon recognition of the first Carrier Return code, outside the Region, the code is converted to a Space as previously described in connection with FIGS. 2–7. However, the occurrence of a double Carrier Return code sequence indicates the end of a paragraph and it is then necessary to record two Carrier Return codes on the left-hand tape and delete the Space that was previously recorded when the first Carrier Return code of the double Carrier Return code sequence was recognized. Since the left-hand tape has already moved forward, it is necessary to backstep the left-hand tape over the Space code position in order to re-record the first Carrier Return code.

Figure 9:
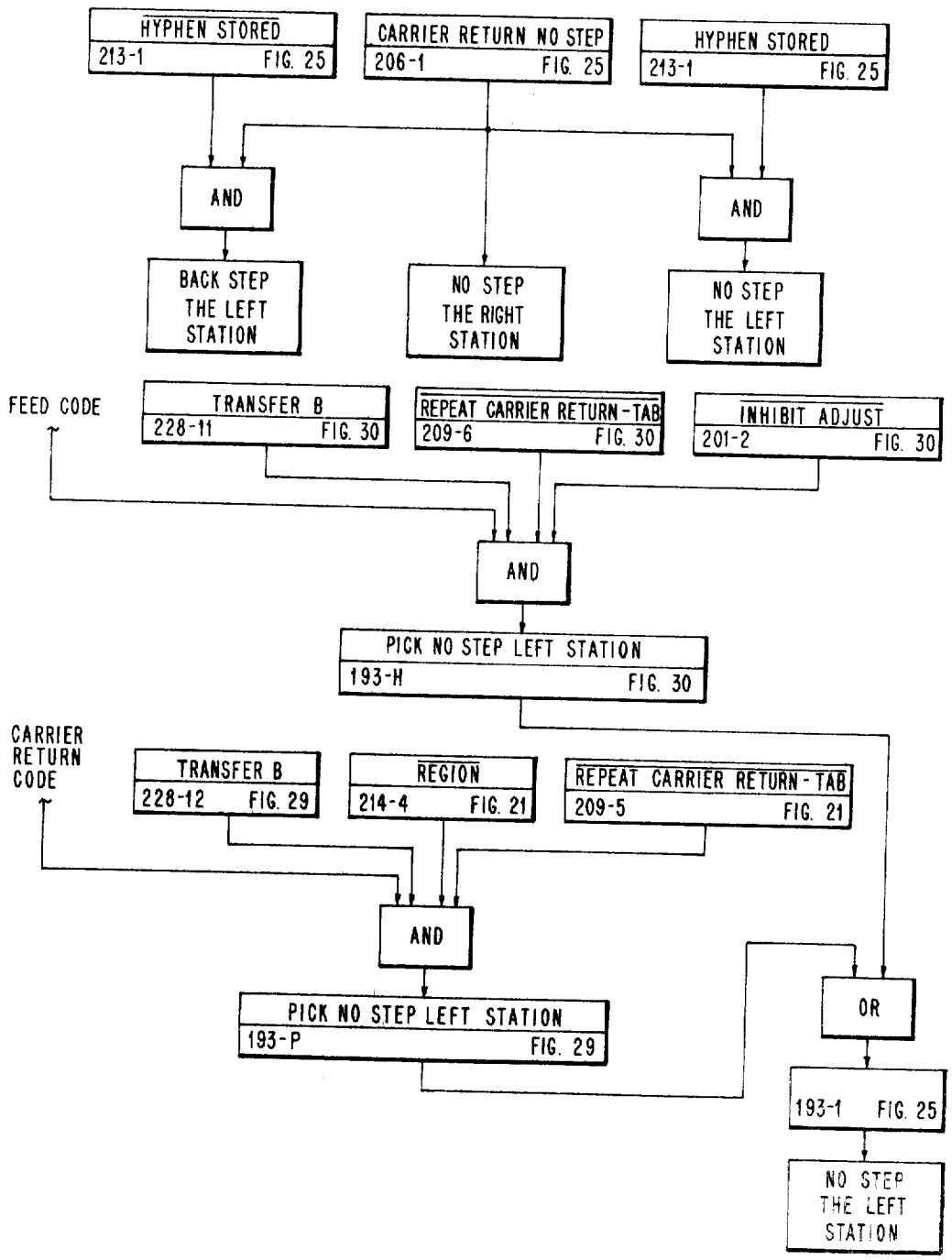
Figure 12:
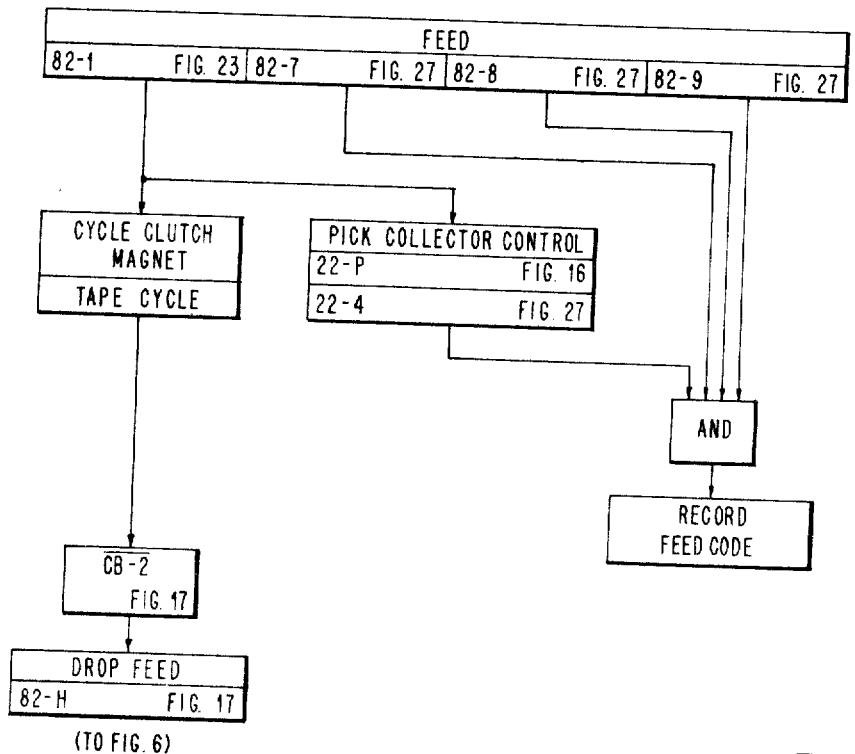
Figure 13:
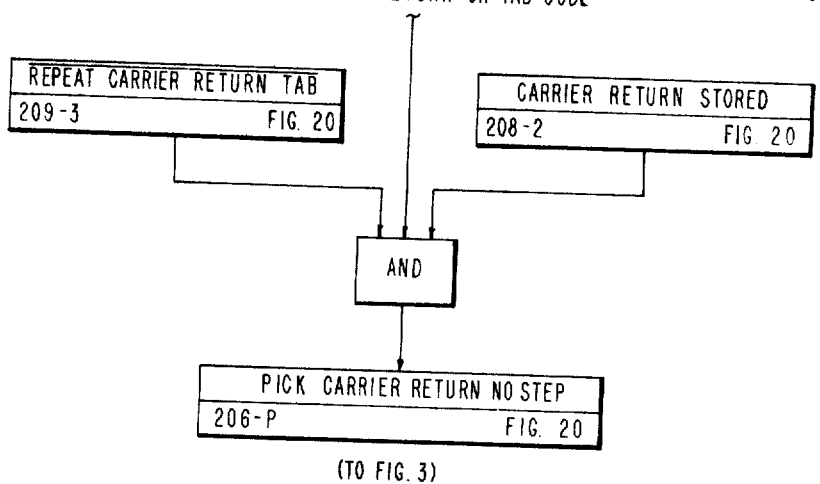

The logic for handling this Carrier Return sequence on the left-hand tape starts in FIG. 13. It continues through FIGS. 3, 4, 10, 11, 12, 6, and 7. The stepping control is in FIG. 9. When the first Carrier Return code is generated, relay R208, Store Carrier Return, FIG. 26, is energized. Accordingly, the 208–2 points are transferred in FIG. 20. The stepping controls, FIG. 9, are sequenced so that the right-hand station does not step upon recognition of the second Carrier Return code. Also, the tape at the left station is backstepped. The second Carrier Return code at the right-hand station is read twice to effect recording on the left-hand tape of two Carrier Return codes in accordance with the original code sequence on the right-hand tape.

With the foregoing in mind, a double Carrier Return code sequence is honored regardless of whether it occurs inside or outside the Region area.

During Playback, the Playback Relay R90 is energized. The path for establishing the recognition of two Carrier Return codes in sequences starts at line 130, FIG. 18, through the 90–7 contacts and contacts 76–12, 56–9, 53–9, closed when the Carrier Return code, that is a "3" bit, is read from the right tape, 46–9, 59–9, 49–9, and by line 18.02 to FIG. 20, contacts 209–3, 208–2, transferred upon recognition of the first Carrier Return code, 201–4 and to the pick coil of the Carrier Return No Step Relay R206, FIG. 20.

As illustrated in FIG. 9, the energization of the Carrier No Step relay R206 transfers the 206–1 point, FIG. 26, which operates the backstep magnet for the left-hand station and opens the circuit for the right-hand station so that no stepping occurs for the right-hand station. Referring to FIG. 25, the circuit for energizing the backstep magnet for the left tape station starts at line 130, CB–7, Pressure Pad Sense Left contact A, the Backstep Left solenoid, 242–7, now transferred, 228–9, now transferred, 213–1, 110–2, 73–2, 70–6, 116–12, 119–2, 112–15, 87–9, and the No Step switch 21.

A Generate Record Cycle and Record Left sequence is initiated as shown in the flow charts of FIGS. 3 and 4 by closure of the 206–2 point, FIG. 21, by line 21.02 to FIG. 29, the 228–7 contacts and the Generate Record Cycle relay R198, FIG. 29.

Figure 10:
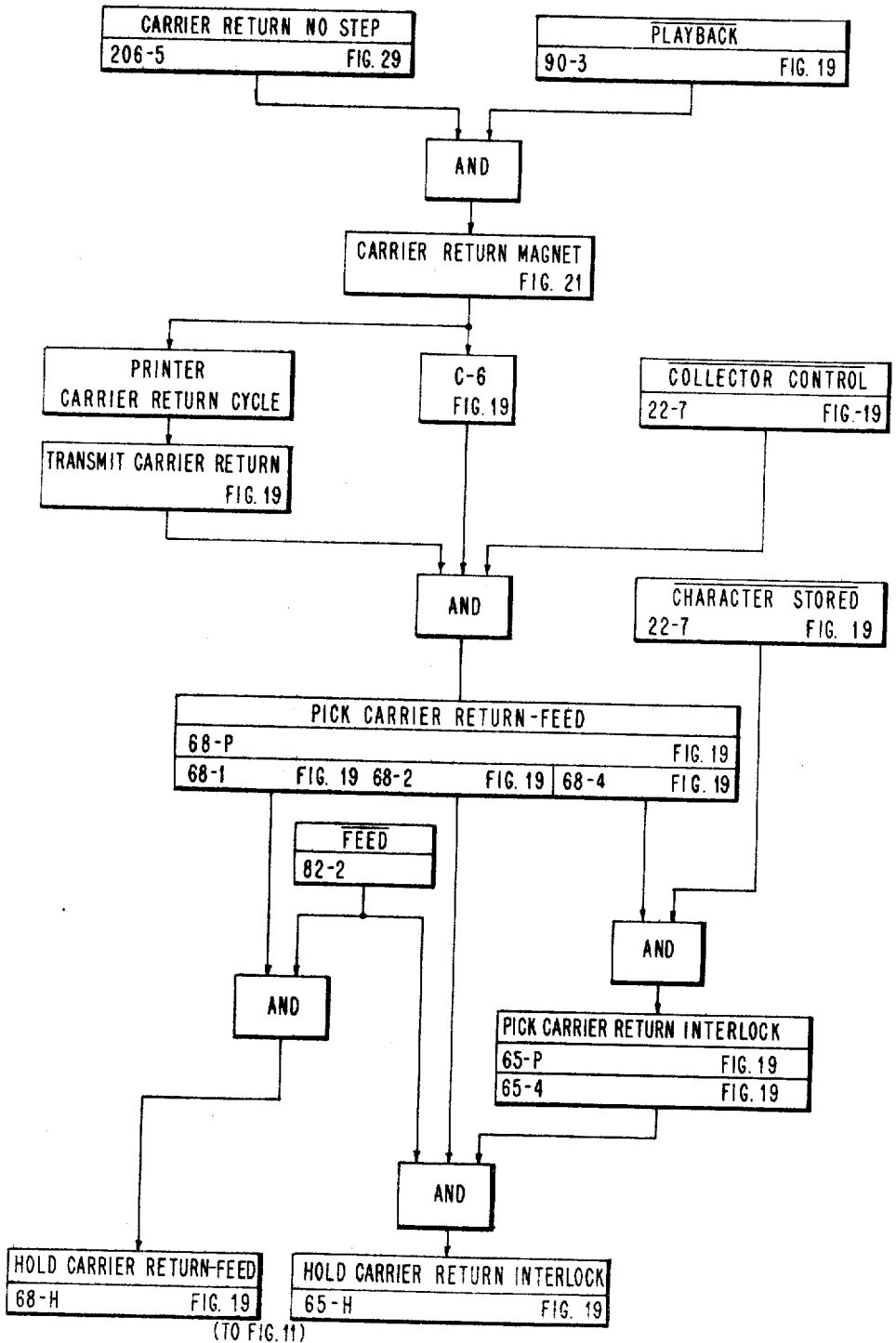
Figure 11:
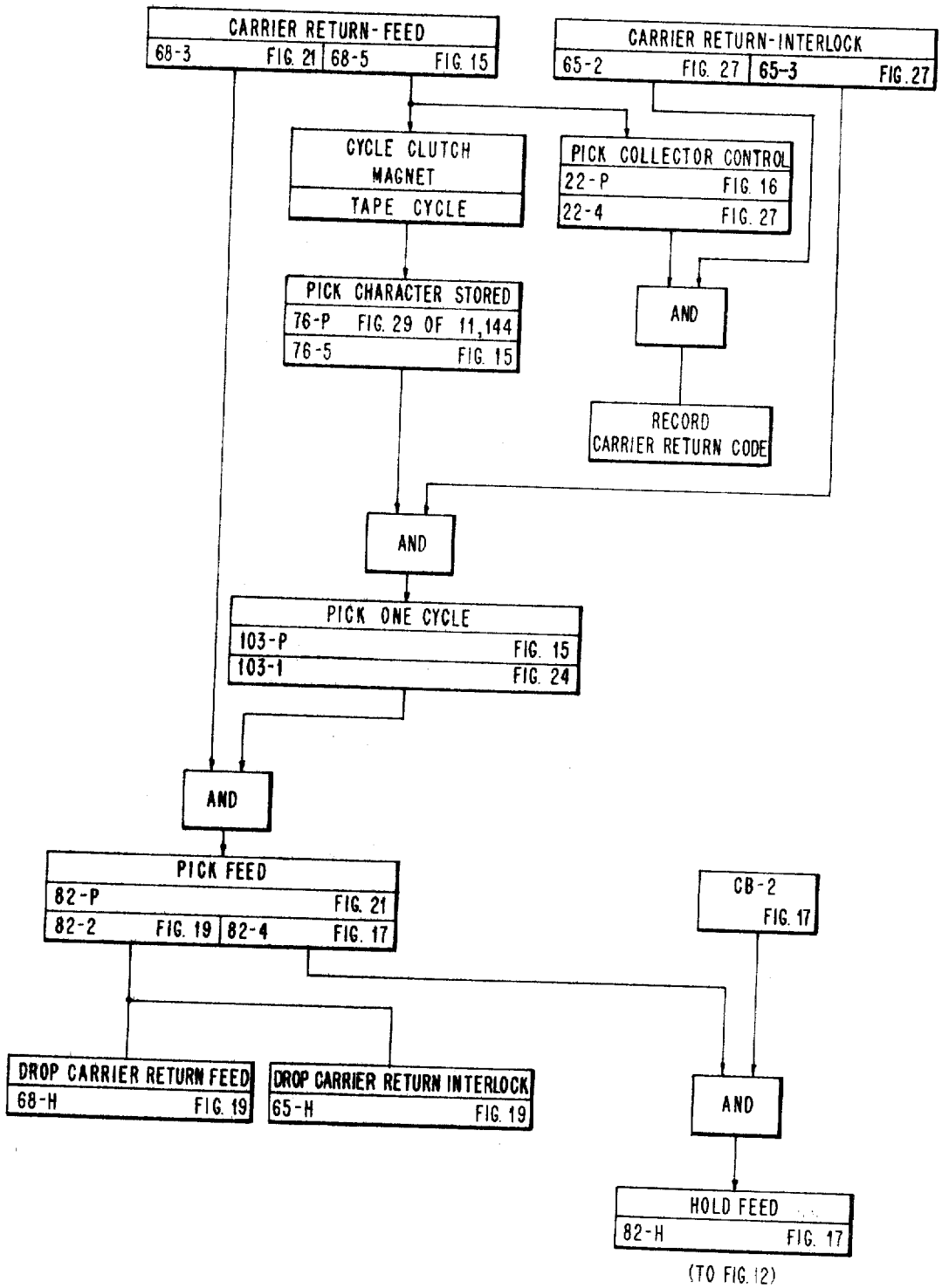

The sequence to effect recording of the Carrier Return codes following the energization of the Active Keyboard relay R231 and the Record Relay R19 in FIG. 4 continues to FIGS. 10, 11, and 12 and returns to FIGS. 6, and 7 rather than to FIG. 5. The FIG. 5 sequence is followed when a Carrier Return is converted to a Space code on the left-hand tape.

Referring to FIG. 10, the Carrier Return No Step contact 206–5, FIG. 29, passes potential from the Playback contact 90–3, FIG. 19, to line 29.05 and directly to FIG. 22 to energize the Carrier Return magnet in printer 1. As a result, the printer cycle and the C–6 contacts are transferred, FIG. 19. Transfer of the C–6 contacts in connection with the Carrier Return Transmit contacts, FIG. 19, energizes the Carrier Return Feed relay R68, FIG.19. The Carrier Return Interlock relay R65 is picked and held in FIG. 19, as shown in FIG. 10. Also, the hold coil for the Carrier Return Feed relay is maintained energized through the 68–1 point, FIG. 19. Referring to FIG. 11, the energization of the Carrier Return Feed relay R68 closes the 68–5 contacts, FIG. 15 which by way of line 15.02 energizes the cycle clutch magnet in FIG. 16. Also, the Collector Control relay R22 is picked in FIG. 16 by a parallel path. As a result of the foregoing, the Carrier Return code transmitted by printer 1 is recorded on the tape at the left-hand station 14, FIG. 1. Following this, the one Cycle relay R103 is picked in FIG. 15.

The Feed relay R82 is picked in FIG. 21 by the following circuit. Potential from line 130 passes through the One Cycle contact 103–1, now transferred, by line 24.03 to FIG. 21 and the 68–3 contacts, now closed, to energize the relay R82. The 82–4 contacts, FIG. 17, in connection with a CB–2 impulse maintains the Feed relay R82 hold coil energized, FIG. 17. Transfer of the 82–2 contacts drops the Carrier Return Feed relay R68 and the Carrier Return Interlock relay R65 in FIG. 19.

The energization of the Feed relay R82 closes various contacts of the relay as shown in the flow chart of FIG. 12 to effect the recording of a Feed code on the tape at the left-hand station. The 82–1 points, FIG. 23, by line 23.02 close a circuit for picking the cycle clutch in the tape unit and the Collector Control relay R22, FIG. 16, when the circuit breaker CB–5 closes, FIG. 16. Various relay points including 82–7, 82–8 and 82–9 now transferred transmit signals for recording the Feed code in the left-hand tape. When circuit breaker CB–2 opens near the end of the tape unit cycle, the Feed relay R82 is dropped, FIG. 17.

Machine cycles taken during the Active Keyboard mode do not cause right station stepping because the right station is not being addressed. In FIG. 25, the contacts PP Sense Right A and 245–6 are open, and 242–7 is transferred.

The apparatus now returns to a Transfer Adjust mode. The second Carrier Return code is read again from the right-hand tape and, as shown in FIG. 2, effects operation of the Carrier Return magnet, FIG. 21, through 201–3, normally closed, and 201–5 now transferred.

SEQUENCE B-5, CONVERSION OF SPACE CODE IN REGION (RIGHT TAPE) TO CARRIER RETURN OPERATION OF PRINTER AND CARRIER RETURN CODE (LEFT TAPE)

The conversion of code sequence B-5 on the right tape which is character, space, character when encountered in the Region to a Carrier Return operation of the Printer and a Character, Carrier Return, Feed Code, Character code sequence on the left tape is now described. The procedure follows flow charts in FIG. 8, FIGS. 3 and 4, FIGS. 10–12, and FIGS. 6 and 7. The stepping control is shown in FIG. 9.

Figure 8:
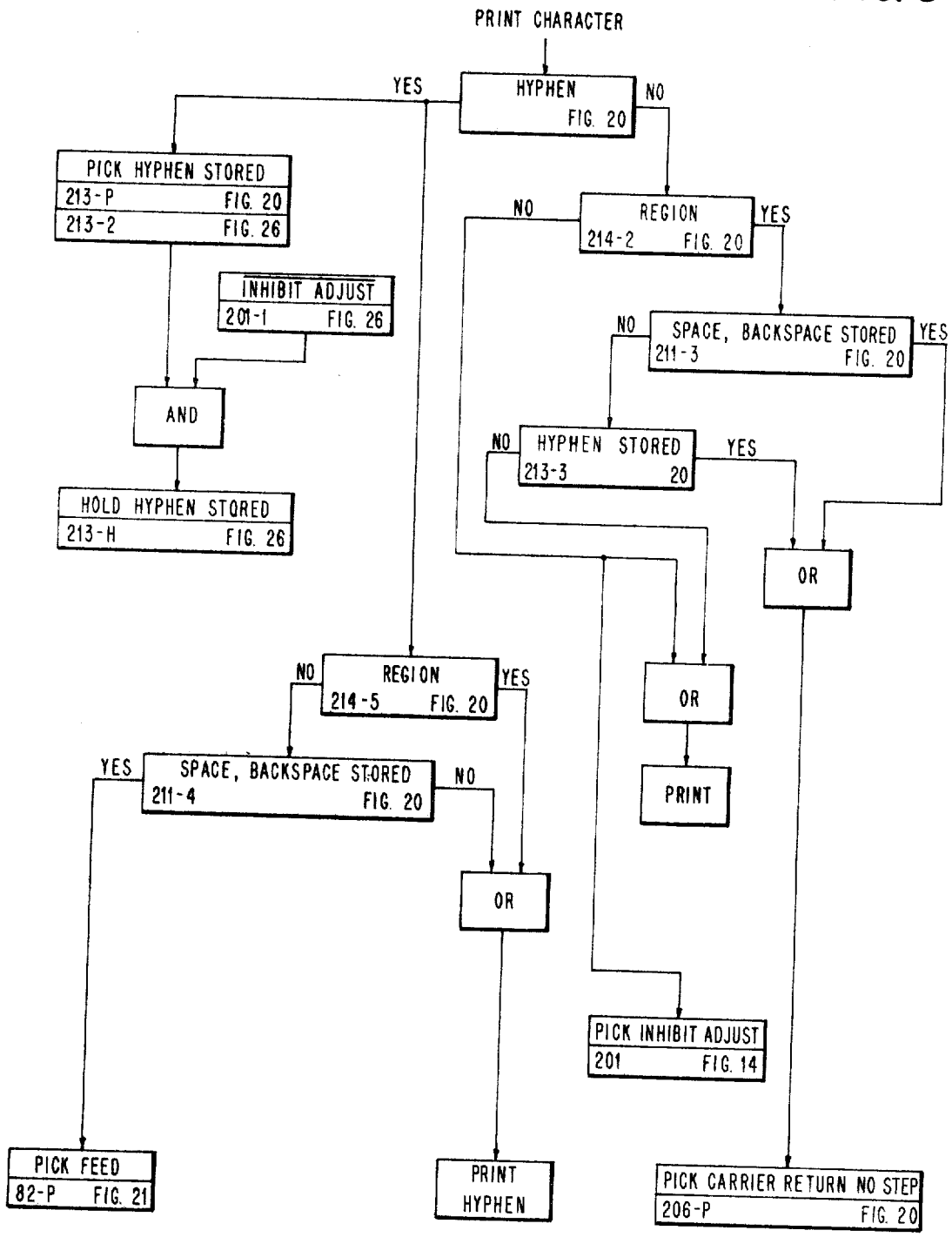

Referring to FIG. 8, the recognition of a Space code in Region effects energization of the Space Stored relay R211, FIG. 18. Relay R211 is held in FIG. 26.

In FIG. 20, a path exists through the character bit contacts, 214-2 contacts, now transferred since print head 5 is in the Region and the 211-3 contacts to energize relay R206, Carrier Return No Step.

The procedure then follows FIGS. 3 and 4, 10–12, and 6 and 7 in order to change the mode of the apparatus from Transfer Adjust to Active Keyboard and Record Left for recording the Carrier Return code and the Feed code on the left tape instead of the space code that was on the right tape. The stepping control is shown, as before, in FIG. 9.

Following the conversion operation, the apparatus returns to the Transfer Adjust mode as previously discussed.

OTHER TRANSFER ADJUST CODE SEQUENCES

FIG. 8 illustrates various logic involved in recognizing other code sequences during a Transfer Adjust operation and for effecting a proper code conversion necessary both for the printer and for recording the left-hand tape at station 14, FIG. 1. The flow chart in FIG. 8 is essentially like the adjustment procedures disclosed in the aforementioned U.S. Patent 3,297,144 to which reference is made for a more particular operation of the adjustment logic. Primarily, a determination is made as to whether print head 5 is outside the line ending Region or within the line ending Region and the action of the printer is dependent upon this condition. Reference is also made to Table B which illustrates the code sequences B–1 through B–15 to most of which, the flow chart in FIG. 8 pertains. The various relays and relay contacts required to determine the Transfer Adjust code sequences and actions required are generally in FIGS. 20, 21 and 26. As indicated in FIG. 8, Relay 206, FIG. 20, the Carrier Return No Step Relay is energized and is utilized along with the Read Carrier Return relay R204, FIG. 21, to determine whether an automatic change in mode from a Transfer Adjust to a Record Left is required in order to convert the original code sequences from the right-hand tape to other appropriate code sequences as line adjustment proceeds.

As described in the Sims Patent 3,297,124 a syllable type hyphen is indicated by the code sequence Space, Backspace, and Hyphen. A word type hyphen, such as in brother-in-law, is simply indicated by a Hyphen code. If a syllable type hyphen code sequence is encountered outside the line ending Region, the Feed relay R82 is effective to simply step the tape unit and bypass the codes involved. If the syllable type hyphen code sequence is encountered in the Region area, then a hyphen is printed and a Carrier Return operation is performed. A word type hyphen is printed whether encountered inside the Region or outside the Region. Code sequences other than Space, Backspace, such as Upshift, Downshift, may be used to distinguish the different types of Hyphens. Also, a special Hyphen code can be provided for.

As noted in FIG. 8, any time a Hyphen code is sensed, the Hyphen Stored Relay R213 is picked and held. If the Hyphen occurs in the Region, it is printed, but if it occurs outside the Region a determination is made as to whether a Space code and a Backspace code were previously stored. If a Space and Backspace code were stored as indicated by relay R211, FIG. 20, being energized, the Feed Relay R82, FIG. 21, is energized.

Referring to Table B, the code sequences B–7 through B–14 involve a Hyphen code in combination with various other codes. As seen in code sequence B–9, one or more hyphens accompanied by normal print characters are printed and recorded as they occur. However, if the B–9 sequence occurs in the Region, a Carrier Return operation also takes place and the mode of the equipment is charged from a Transfer Adjust to a Record Left mode in order to record the Carrier Return code on the left-hand tape. In addition, the Carrier Return code is accompanied by a Feed code.

To accomplish the conversion of codes of the type just described, the logical sequences for controlling stepping of both the right and left stations as shown in FIG. 9 and for controlling the mode of operation of the equipment is shown in FIGS. 8, 3, 4, 10, 11, 12, 6 and 7, in that order.

RECOGNITION OF TAB CODES IN THE CODE SEQUENCES, TABLE B

The recognition and handling of Tab codes in the line ending Region and outside the line ending Region occurs as indicated in Table B. The sequences involving Tab codes are sequences B–2 and B–15. Recognition of a Carrier Return code and one or more Tab codes outside the line ending Region will be honored by the apparatus as shown under printer action, Table B, so that the printer performs a Space operation, a Carrier Return operation, and the number of Tabulation operations required by the codes read. Also, some of the Carrier Return code, Tab code and Feed code sequences are indicated logically in FIG. 9 for controlling the stepping of the left station, as appropriate, in order to insure that the left-hand tape has the proper code sequences recorded thereon.

ALTERNATIVE TRANSFER AND CONVERSION

The transfer of coded characters just described has been from the right tape (original) to the left tape (revised). Alternatively, the transfer can be made from left tape (original) to right tape (revised) with the Active Keyboard-Record Left Mode established for the right tape by line 72a, FIG. 1.

While the invention has been particularly shown and described with reference to a preferred embodiment thereof, it will be understood by those skilled in the art that various changes in form and details may be made therein without departing from the spirit and scope of the invention.

What is claimed is:

1. Data processing apparatus, comprising:
    means for reading a first revisable record media including means to develop signals representative of coded characters therein;
    means operable in a transfer operation and normally responsive to said developed signals for concurrently recording corresponding identical characters in a plurality of character locations of a second revisable record media;
    an alternative source of signals representative of coded characters generally corresponding identically to the coded characters in said first record media, but occasionally differing therefrom;
    and conversion means for recognizing when character signals of said alternative source and said first revisable record media differ to immediately interrupt said transfer operation to revise at least one of said identically recorded character locations by recording therein a said differing character under control of said alternative source.

2. The apparatus of claim 1, further comprising:
    a utilizing means for printing a document concurrently with the recording of said second record media.

3. The apparatus of claim 2, wherein:
said developed signals are supplied by parallel paths to said second record media and to said utilizing means; and wherein
said conversion means is effective to establish said utilizing means as said alternative source of signals whenever character revision is required for recording in said second record media.

4. The apparatus of claim 1 further comprising:
a second alternative source of signals controlled by said conversion means for providing additional differing characters for use in revising said identically recorded character locations.

5. The apparatus of claim 1, further comprising:
means for recognizing the completion of the revision of said at least one character location and re-start said transfer operation.

6. The apparatus of claim 1, further comprising:
a utilizing means associated with said alternative source for printing a document concurrently with the recording of said second record media.

7. The apparatus of claim 6, wherein:
said derived signals are supplied concurrently both to said second record media and to said utilizing means; and wherein
said conversion means includes logic means to establish said utilizing means as a source of signals whenever said differing characters are required for recording in said second record media.

8. Data processing apparatus, comprising:
means for reading a first record media to derive signals representative of coded characters therein;
means normally responsive to said derived signals for recording corresponding characters in a second record media;
a utilizing means for printing a document concurrently with the recording of said second record media;
mode control means having a first mode in which character signals are transferred from said first record media to said second record media, and a second mode in which character signals are supplied from said utilizing means to said second record media;
and conversion means for recording predetermined coded characters in said second record media instead of particular selected ones of said coded characters read in said first record media, said conversion means maintaining said first mode of operation as a normal mode, and establishing said second mode of operation only when a change is required in characters provided from said first record media to said second record media.

9. The apparatus of claim 8, further comprising:
means in said utilizing means for establishing left and right margin limits in accordance with a desired document line format; and wherein
said conversion means comprises line adjustment logic effective to establish character printing and operation of said utilizing means in accordance with the document format requirements indicated by said margin limit means.

10. The apparatus of claim 8, further comprising:
means associated with said margin limit means to generate non-region and region indications for control of said conversion means and corresponding to relative positions of said print head and said document as printing of lines of information proceeds to indicate when printing on a document is not in a line ending region and when printing on a document is in a line ending region; and
means in said first record media means and said second record media recording means for reading and recording a magnetic tape record media, respectively, with said first record media including at least a first code sequence from which said reading means derives signals; and printer means associater with said utilizing means, said printer means having a single element print head mounted for escapement and printing movement adjacent to a document to be printed.

11. The apparatus of claim 8, further comprising:
stepping control means for said first and second record media;
and means in said line adjustment logic to generate no-step and back-step control signals for controlling said stepping control means, as appropriate, for re-reading and/or rerecording signals in said first and second record media in order to establish the code sequences indicated.

12. The apparatus of claim 8, further comprising:
means in said apparatus for reading and recording syllable-type Hyphens and word-type Hyphens that are represented by distinctively different code combinations.

13. The apparatus of claim 9, wherein:
means are provided for originally recording said first record media concurrently with operation of said printer, and wherein
the document format arrangement of characters in said first record media differs from that of said utilizing means during operation of said line adjustment logic.

14. The apparatus of claim 11, wherein:
said mode control means includes means to change from a Transfer mode to an Active Keyboard mode in order to rerecord a single character in said second record media when a change in code sequence from said first record media is required; wherein
said line adjustment logic includes means to provide a no-step signal to no step said second record media during any code changes of the nature just mentioned; wherein
said mode control means includes means further operative to establish a plurality of cycles to rerecord a plurality of character positions in said second record media as required and indicated by said code sequence tabulation; wherein
said line adjustment logic includes means effective to both no-step and back-step said second record media in order to access a plurality of character recording positions thereon, and wherein
said line adjustment logic includes means further operative to no-step said first record media as required, in order to reread coded characters in said first record media as required to establish the converted code sequences indicated.

15. The apparatus of claim 9, wherein:
said margin limit means provides indications when printing on a document is not in a line ending region and when printing on a document is in a line ending region;
said reading means comprises means for deriving at least a first code sequence from said first record media; and further comprising:
signal generating means in said utilizing means for providing printer signals representative of characters printed and printer operations performed;
first means in said conversion means for controlling said utilizing means by derived signals from said first code sequence and indications from said margin limit means that printing is not in the line ending region to print and perform printer operations in accordance with a second code sequence in order to produce a document having a line format as determined by said margin limit means;
second means in said conversion means for controlling said recording means by derived signals from said first code sequence and printer signals indicative of characters actually printed and printer operations performed when said margin limit means indicates that printing is not in the line ending region to record coded characters in said second record media in accordance with a third code sequence representative of the actual printing and operation of said utilizing means;

third means in said conversion means for controlling said utilizing means by derived signals from said first code sequence and indications from said margin limit means that printing on a document is in the line ending region to print and perform printer operations in accordance with a fourth code sequence in order to also produce a document having a line format as determined by said margin limit means;

and fourth means in said conversion means for controlling said recording means by derived signals from said first code sequence and printer signals indicative of characters printed and printer operations performed when said margin limit means indicates that printing is in the line ending region to record coded characters in said second record media in accordance with a fifth code sequence also representative of the actual printing and operation of said utilizing means.

16. The apparatus of claim 15 further comprising means for deriving a code sequence designated B–1 wherein:

the first code sequence derived from said first record media is Successive Carrier Returns;

the second code sequence for printing and performance of operations by said utilizing means when not in the line ending region is Space, Successive Carrier Returns;

the third code sequence recorded in said second record media when not in the line ending region is *Space, Successive Carrier Returns;

the fourth code sequence for printing and performance of operations by said utilizing means when in the line ending region is Successive Carrier Returns;

the fifth code sequence recorded in said second record media when in the line ending region is Successive Carrier Returns;

and wherein said conversion means is controlled by derived signals and printer signals to generate a first Carrier Return code followed by a redundant code in code sequences designated * for recording on said second media.

17. The apparatus of claim 15 further comprising means for deriving a code sequence designated B–2 wherein:

the first code sequence derived from said first record media is CR, TAB(S);

the second code sequence for printing and performance of operations by said utilizing means when not in the line ending region is SP, CR, TAB(S);

the third code sequence recorded in said second record media when not in the line ending region is *SP, CR, TAB(S);

the fourth code sequence for printing and performance of operations by said utilizing means when in the line ending region is CR, TAB(S);

the fifth code sequence recorded in said second record media when in the line ending region is CR, TAB(S);

and wherein said conversion means is controlled by derived signals and printer signals to generate a first Carrier Return code followed by a redundant code in sequences designated * for recording on said second media.

18. The apparatus of claim 15 further comprising means for deriving a code sequence designated B–3 wherein:

the first code sequence derived from said first record media is CH, SPACE, SP, CH;

the second code sequence for printing and performance of operations by said utilizing means when not in the line ending region is CH, SPACE, SP, CH;

the third code sequence recorded in said second record media when not in the line ending region is CH, SPACE, SP, CH;

the fourth code sequence for printing and performance of operations by said utilizing means when in the line ending region is CH, SPACE(S), SP, CR, CH;

the fifth code sequence recorded in said second record media when in the line ending region is *CH, SPACE(S), CR, CH;

and wherein said conversion means is controlled by derived signals and printer signals to generate a first Carrier Return code followed by a redundant code in code sequences designated * for recording on said second media.

19. The apparatus of claim 15 further comprises means for deriving a code sequence designated B–4 wherein:

the first code sequence derived from said first record media is CH, SPACE(S), CR, CH;

the second code sequence for printing and performance of operations by said utilizing means when not in the line ending region is CH, SPACE(S), SP, CH;

the third code sequence recorded in said second record media when not in the line ending region is CH, SPACE(S), SP, CH;

the fourth code sequence for printing and performance of operations by said utilizing means when in the line ending region is CH, SPACE(S), CR, CH;

the fifth code sequence recorded in said second record media when in the line ending region is CH, SPACE(S), CR, CH.

20. The apparatus of claim 15 further comprises means for deriving a code sequence designated B–5 wherein:

the first code sequence derived from said first record media is CH, SP, CH;

the second code sequence for printing and performance of operations by said utilizing means when not in the line ending region is CH, SP, CH;

the third code sequence recorded in said second record media when not in the line ending region is CH, SP, CH;

the fourth code sequence for printing and performance of operations by said utilizing means when in the line ending region is CH, SP, CR, CH;

the fifth code sequence recorded in said second record media when in the line ending region is *CH, CR, CH;

and wherein said conversion means is controlled by derived signals and printer signals to generate a first Carrier Return Code followed by a redundant code in code sequences designated * for recording on said second media.

21. The apparatus of claim 15 further comprising means for deriving a code sequence designed B–6 wherein:

the first code sequence derived from said first record media is CH, CR, CH;

the second code sequence for printing and performance of operations by said utilizing means when not in the line ending region is CH, SP, CH;

the third code sequence recorded in said second record media when not in the line ending region is **CH, SP, CH;

the fourth code sequence for printing and performance of operations by said utilizing means when in the line ending region is CH, CR, CH;

the fifth code sequence recorded in said second record media when in the line ending region is CH, CR, CH;

and wherein said conversion means is controlled by derived signals and printer signals to omit redundant codes in sequences designated **.

22. The apparatus of claim 15 further comprising means for deriving a code sequence designated B–7 wherein:
the first code sequence derived from said first record media is CH, SP, HYP(S), SP, CH;
the second code sequence for printing and performance of operations by said utilizing means when not in the line ending region is CH, SP, HYP(S), SP, CH;
the third code sequence recorded in said second record media when not in the line ending region is CH, SP, HYP(S), SP, CH;
the fourth code sequence for printing and performance of operations by said utilizing means when in the line ending region is CH, SP, HYP(S), SP, CR, CH;
the fifth code sequence recorded in said second record media when in the line ending region is *CH, SP, HYP(S), SP, CR, CH;
and wherein said conversion means is controlled by derived signals and printer signals to generate a first Carrier Return code followed by a redundant code in code sequences designated * for recording on said second media.

23. The apparatus of claim 15 further comprising means for deriving a code sequence designated B–8 wherein:
the first code sequence derived from said first record media is CH, SP, HYP(S), SP, CR, CH;
the second code sequence for printing and performance of operations by said utilizing means when not in the line ending region is CH, SP, HYP(S), SP, CH;
the third code sequence recorded in said second record media when not in the line ending region is **CH, SP, HYP(S), SP, CH;
the fourth code sequence for printing and performance of operations by said utilizing means when in the line ending region is CH, SP, HYP(S), SP, CR, CH;
the fifth code sequence recorded in said second record media when in the line ending region is CH, SP, HYP(S), SP, CR, CH;
and wherein said conversion means is controlled by derived signals and printer signals to omit redundant codes in sequences designated **.

24. The apparatus of claim 15 further comprising means for deriving a code sequence designated B–9 wherein:
the first code sequence derived from said first record media is CH, HYP(S), CH;
the second code sequence for printing and performance of operations by said utilizing means when not in the line ending region is CH, HYP(S), CH;
the third code sequence recorded in said second record media when not in the line ending region is CH, HYP(S), CH;
the fourth code sequence for printing and performance of operations by said utilizing means when the line ending region is CH, HYP(S), CR, CH;
the fifth code sequence recorded in said second record media when in the line ending region is *CH HYP(S), CR, CH;
and wherein said conversion means is controlled by derived signals and printer signals to generate a first Carrier Return code followed by a redundant code in code sequences designated * for recording on said second media.

25. The apparatus of claim 15 further comprising means for deriving a code sequence designated B–10 wherein:
the first code sequence derived from said first record media is CH, HYP(S), CR, CH;
he second code sequence for printing and performance of operations by said utilizing means when not in the line ending region is CH, HYP(S), CH;
the third code sequence recorded in said second record media when not in the line ending region is **CH, HYP(S), CH;
the fourth code sequence for printing and performance of operations by said utilizing means when in the line ending region is CH, HYP(S), CR, CH;
the fifth code sequence recorded in said second record media when in the line ending region is CH, HYP(S), CR, CH;
and wherein said conversion means is controlled by derived signals and printer signals to omit redundant codes in sequences designated **.

26. The apparatus of claim 15 further comprising means for deriving a code sequence designated B–11 wherein:
the first code sequence derived from said first record media is CH, SP, BSP, HYP, CH;
the second code sequence for printing and performance of operations by said utilizing means when not in the line ending region is CH, SP, BSP, CH;
the third code sequence recorded in said second record media when not in the line ending region is CH, SP, BSP, CH;
the fourth code sequence for printing and performance of operations by said utilizing means when in the line ending region is CH, SP, BSP, HYP, CR, CH;
the fifth code sequence recorded in said second record media when in the line ending region is *CH, SP, BSP, HYP, CR, CH;
and wherein said conversion means is controlled by derived signals and printer signals to generate a first Carrier Return code followed by a redundant code in code sequences designated * for recording on said second media.

27. The apparatus of claim 15 further comprising means for deriving a code sequence designated B–12 wherein:
the first code sequence derived from said first record media is CH, SP, BSP, HYP, CR, CH;
the second code sequence for printing and performance of operations by said utilizing means when not in the line ending region is CH, SP, BSP, CH;
the third code sequence recorded in said second record media when not in the line ending region is CH, SP, BSP, HYP, CH;
the fourth code sequence for printing and performance of operations by said utilizing means when in the line ending region is CH, SP, BSP, HYP, CR, CH;
the fifth code sequence recorded in said second record media when in the line ending region is CH, SP, BSP, HYP, CR, CH.

28. The apparatus of claim 15 further comprising means for deriving a code sequence designated B–13 wherein:
the first code sequence derived from said first record media is CH, BSP, SP, HYP, CH;
the second code sequence for printing and performance of operations by said utilizing means when not in the line ending region is CH, BSP, SP, CH;
the third code sequence recorded in said second record media when not in the line ending region is CH, BSP, SP, HYP, CH;
the fourth code sequence for printing and performance of operations by said utilizing means when in the line ending region is CH, BSP, SP, HYP, CR, CH;
the fifth code sequence recorded in said second record media when in the line ending region is *CH, BSP, SP, HYP, CR, CH;
and wherein said conversion means is controlled by derived signals and printer signals to generate a first Carrier Return code followed by a redundant code in code sequences designated * for recording on said second media.

29. The apparatus of claim 15 further comprising means for deriving a code sequence designated B-14 wherein:

the first code sequence derived from said first record media is CH, BSP, SP, HYP, CH;

the second code sequence for printing and performance of operations by said utilizing means when not in the line ending region is CH, BSP, SP, CH;

the third code sequence recorded in said second record media when not in the line ending region is **CH, BSP, SP, HYP, CH;

the fourth code sequence for printing and performance of operations by said utilizing means when in the line ending region is CH, BSP, SP, HYP, CR, CH;

the fifth code sequence recorded in said second record media when in the line ending region is CH, BSP, SP, HYP, CR, CH;

and wherein said conversion means is controlled by derived signals and printer signals to omit redundant codes in sequences designated **.

30. The apparatus of claim 15 further comprising means for deriving a code sequence designated B-15 wherein:

the first code sequence derived from said first record media is CH, TAB;

the second code sequence for printing and performance of operations by said utilizing means when not in the line ending region is Normal—if tabulation ends beyond end of line, machine stops;

the third code sequence recorded in said second record media when not in the line ending region is CH, TAB;

the fourth code sequence for printing and performance of operations by said utilizing means when in the line ending region is CH, TAB—if tabulation stops beyond end of line, machine stops;

the fifth code sequence recorded in said second record media when in the line ending region is CH, TAB.

References Cited

UNITED STATES PATENTS

| | | | |
|---|---|---|---|
| 3,031,647 | 3/1962 | Dirks | 340—172.5 |
| 2,827,623 | 1/1955 | Ainsworth | 340—172.5 |
| 3,340,986 | 2/1966 | Adams et al. | 197—20 |

PAUL J. HENON, Primary Examiner

P. R. WOODS, Assistant Examiner

U.S. Cl. X.R.

197—19, 20

UNITED STATES PATENT OFFICE
CERTIFICATE OF CORRECTION

Patent No. 3,490,004                          January 13, 1970

Roger F. Ross

It is certified that error appears in the above identified patent and that said Letters Patent are hereby corrected as shown below:

Column 9, line 29, "printed" should read -- printer --. Column 11, line 31, "eample" should read -- example --. Column 21, line 61, and column 22, lines 5 and 14, the claim reference numeral "8", each occurrence, should read -- 9 --. Column 24, lines 14 and 31, each occurrence, "comprises" should read -- comprising --.

Signed and sealed this 22nd day of December 1970.

(SEAL)
Attest:

Edward M. Fletcher, Jr.                      WILLIAM E. SCHUYLER, JR.
Attesting Officer                                 Commissioner of Patents